(12) United States Patent
Salmon et al.

(10) Patent No.: US 9,582,501 B1
(45) Date of Patent: Feb. 28, 2017

(54) TECHNIQUES FOR AUTOMATIC GENERATION OF NATURAL LANGUAGE TEXT

(71) Applicant: YSEOP SA, Lyons (FR)

(72) Inventors: Raphaël François André Salmon, Lyons (FR); Ludan Stoeckle, Miribel (FR); Alain Kaeser, Paris (FR)

(73) Assignee: YSEOP SA, Lyon (FR)

( * ) Notice: Subject to any disclaimer, the term of this patent is extended or adjusted under 35 U.S.C. 154(b) by 134 days.

(21) Appl. No.: 14/305,183

(22) Filed: Jun. 16, 2014

(51) Int. Cl.
*G06F 17/27* (2006.01)
*G06F 17/28* (2006.01)

(52) U.S. Cl.
CPC ............... *G06F 17/2881* (2013.01)

(58) Field of Classification Search
USPC ........................................... 704/7–10
See application file for complete search history.

(56) References Cited

U.S. PATENT DOCUMENTS

| 7,937,386 | B2* | 5/2011 | Barrett | G06F 17/30864 707/713 |
| 2002/0046018 | A1* | 4/2002 | Marcu | G06F 17/271 704/9 |
| 2010/0169309 | A1* | 7/2010 | Barrett | G06F 17/30864 707/736 |
| 2010/0169359 | A1* | 7/2010 | Barrett | G06F 17/30616 707/769 |

OTHER PUBLICATIONS

Marcu, D., "From local to global coherence: A bottom-up approach to text planning," Natural Language Generation, Proceedings of the Fourteenth National Conference on Artificial Intelligence and Ninth Innovative Applications of Artificial Intelligence Conference, 1997, pp. 629-635.
Robin, J., et al., "Empirically designing and evaluating a new revision-based model for summary generation," Artificial Intelligence 85 (1996) pp. 135-179.
McKeown, K., "Discourse strategies for generating natural-language text," Artificial Intelligence 27 (1985), pp. 1-41.
Marcu, D., "Building up rhetorical structure trees," Semantics & Discourse (1996) pp. 1069-1074.

* cited by examiner

*Primary Examiner* — Leonard Saint Cyr
(74) *Attorney, Agent, or Firm* — Wolf, Greenfield & Sacks, P.C.

(57) ABSTRACT

Techniques for use in connection with generating text, the techniques comprise: obtaining a plurality of items of content and associated metadata; and generating a document plan comprising a plurality of rhetorical relations among items of content in the plurality of items of content, the plurality of rhetorical relations comprising a first set of one or more rhetorical relations and a second set of one or more rhetorical relations different from the first set, the generating comprising: obtaining a schema specifying the first set of one or more rhetorical relations; and identifying the second set of rhetorical relations based, at least in part, on the associated metadata, wherein the second set of rhetorical relations is not in the schema.

24 Claims, 12 Drawing Sheets

1. "Price below budget" [0.5, 0]
2. "Best price of selection" [0, 0.3]
3. "Better price than official dealer" [0, 0.4]
4. "Urban category good for city driving" [0.2, 0]
5. "Parking aid good for city driving" [0.2, 0.2]
6. "Black color as requested" [0.1, 0]
7. "Black color good for resale" [0, 0.2]
8. "Diesel good for resale" [0, 0.2]
9. "No GPS option" [-0.2, 0]
10. "Cruise control as requested" [0.2, 0]
11. "Aluminum alloy rims as requested" [0.2, 0]
12. "Air conditioning as requested" [0.2, 0]

FIG. 6A

Partial tree

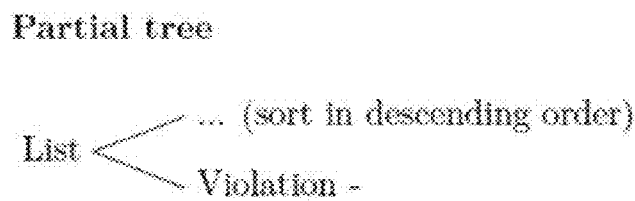

Additional constraints

At least one *Evidence* relation.

FIG. 6B

Decomposition of "Urban category good for city driving"
$\exists x, x.name = $ "Urban category good for city driving" $\Rightarrow$
$\exists y, \exists z, y = Argument($"Urban category"$, 0, x.characteristicScore) \wedge$
$z = Argument($"Good for city driving"$, x.userNeedScore, 0) \wedge Decomposition(x, y, z)$ Decomposition of "Parking aid good for city driving"
$\exists x, x.name = $ "Parking aid good for city driving" $\Rightarrow$
$\exists y, \exists z, y = Argument($"Parking aid option"$, 0, x.characteristicScore) \wedge$
$z = Argument($"Good for city driving"$, x.userNeedScore, 0) \wedge Decomposition(x, y, z)$ Decomposition of "Black color as requested"
$\exists x, x.name = $ "Black color as requested" $\Rightarrow$
$\exists y, \exists z, y = Argument($"Black color"$, 0, x.characteristicScore) \wedge$
$z = Argument($"Color requested"$, x.userNeedScore, 0) \wedge Decomposition(x, y, z)$ Decomposition of "Black color good for resale"
$\exists x, x.name = $ "Black color good for resale" $\Rightarrow$
$\exists y, \exists z, y = Argument($"Black color"$, 0, x.characteristicScore) \wedge$
$z = Argument($"Good for resale"$, x.userNeedScore, 0) \wedge Decomposition(x, y, z)$ Decomposition of "Diesel good for resale"
$\exists x, x.name = $ "Diesel good for resale" $\Rightarrow$
$\exists y, \exists z, y = Argument($"Diesel engine"$, 0, x.characteristicScore) \wedge$
$z = Argument($"Good for resale"$, x.userNeedScore, 0) \wedge Decomposition(x, y, z)$ Decomposition of "Cruise control as requested"
$\exists x, x.name = $ "Cruise control as requested" $\Rightarrow$
$\exists y, \exists z, y = Argument($"Cruise control option"$, 0, x.characteristicScore) \wedge z =$
$Argument($"Option requested"$, x.userNeedScore, 0) \wedge Decomposition(x, y, z)$ Decomposition of "Aluminum alloy rims as requested"
$\exists x, x.name = $ "Aluminum alloy rims as requested" $\Rightarrow$
$\exists y, \exists z, y = Argument($"Aluminum alloy rims option"$, 0, x.characteristicScore) \wedge$ $z = Argument($"Option requested"$, x.userNeedScore, 0) \wedge Decomposition(x, y, z)$ Decomposition of "Air conditioning as requested"
$\exists x, x.name = $ "Air conditioning as requested" $\Rightarrow$
$\exists y, \exists z, y = Argument($"Air conditioning option"$, 0, x.characteristicScore) \wedge$
$z = Argument($"Option requested"$, x.userNeedScore, 0) \wedge Decomposition(x, y, z)$

FIG. 6D

$\exists x, \exists y, \exists z, x.name =$ "Price below budget" $\wedge\ y.name =$ "Best price of selection" $\wedge$
$z.name =$ "Better price than official dealer" $\Rightarrow \exists a, a = Argument($"Price below budget"$, 0.9, 0.7) \wedge$
$Claim(a) \wedge Support(a, y) \wedge Support(a, z)$ $\exists x, x.name =$ "No GPS option" $\vee\ x.name =$ "Cruise control as requested" $\vee$
$x.name =$ "Aluminum alloy rims as requested" $\vee\ x.name =$ "Air conditioning as requested" $\vee$
$x.name =$ "Parking aid good for city driving" $\Rightarrow Topic(x,$ "Option"$)$

FIG. 6E

1. "Price below budget" [0.9, 0.7]
2. "Best price of selection" [0, 0.3]
3. "Better price than official dealer" [0, 0.4]
4. "Urban category" [0, 0]
5. "Parking aid option" [0, 0.2]
6. "Good for city driving" [0.2, 0]
7. "Black color" [0, 0.2]
8. "Color requested" [0.1, 0]
9. "Diesel engine" [0, 0.2]
10. "Good for resale" [0, 0]
11. "No GPS option" [-0.2, 0]
12. "Cruise control option" [0, 0]
13. "Aluminum alloy rims option" [0, 0]
14. "Air conditioning option" [0, 0]
15. "Option requested" [0.2, 0]

FIG. 6F

- Claim("Price below budget")
- Support("Price below budget", "Best price of selection")
- Support("Price below budget", "Better price than official dealer")
- Topic("Parking aid good for city driving", "Option")
- Topic("No GPS option", "Option")
- Topic("Cruise control as requested", "Option")
- Topic("Aluminum alloy rims as requested", "Option")
- Topic("Air conditioning as requested", "Option")
- Decomposition("Urban category good for city driving", "Urban category", "Good for city driving")
- Decomposition("Parking aid good for city driving", "Parking aid option", "Good for city driving")
- Decomposition("Black color as requested", "Black color", "Color requested")
- Decomposition("Black color good for resale", "Black color", "Good for resale")
- Decomposition("Diesel good for resale", "Diesel engine", "Good for resale")
- Decomposition("Cruise control as requested", "Cruise control option", "Option requested")
- Decomposition("Aluminum alloy rims as requested", "Aluminum alloy rims option", "Option requested")
- Decomposition("Air conditioning as requested", "Air conditioning option", "Option requested")

FIG. 6G

TECHNIQUES FOR AUTOMATIC GENERATION OF NATURAL LANGUAGE TEXT

FIELD OF INVENTION

The techniques described herein relate to the field of automatic generation of natural language text, and more particularly to techniques for organizing the presentation of information in automatically generated text.

BACKGROUND

Natural language generation (NLG) is the generation of human-language text (i.e., text in a human language) based on information in non-linguistic form. For example, natural language generation techniques may be used to generate a textual description of a day of trading of a particular stock based on data indicating the stock price and volume throughout the day, to generate a confirmation e-mail for an online purchase made via the Internet from data describing the purchase, or to generate real-time comments about a sporting event using data about the game.

SUMMARY

Some embodiments are directed to a method for use in connection with generating text. The method comprises using at least one computer hardware processor to perform: obtaining a plurality of items of content and associated metadata; and generating a document plan comprising a plurality of rhetorical relations among items of content in the plurality of items of content, the plurality of rhetorical relations comprising a first set of one or more rhetorical relations and a second set of one or more rhetorical relations different from the first set. The generating comprises obtaining a schema specifying the first set of one or more rhetorical relations; and identifying the second set of rhetorical relations based, at least in part, on the associated metadata, wherein the second set of rhetorical relations is not in the schema.

Some embodiments are directed to at least one non-transitory computer-readable storage medium storing processor executable instructions that, when executed by at least one computer hardware processor, cause the at least one computer hardware processor to perform a method for use in connection with generating text. The method comprises using at least one computer hardware processor to perform: obtaining a plurality of items of content and associated metadata; and generating a document plan comprising a plurality of rhetorical relations among items of content in the plurality of items of content, the plurality of rhetorical relations comprising a first set of one or more rhetorical relations and a second set of one or more rhetorical relations different from the first set. The generating comprises obtaining a schema specifying the first set of one or more rhetorical relations; and identifying the second set of rhetorical relations based, at least in part, on the associated metadata, wherein the second set of rhetorical relations is not in the schema.

Some embodiments are directed to a system, comprising at least one computer hardware processor; and at least one non-transitory computer-readable storage medium storing processor executable instructions that, when executed by the at least one computer hardware processor, cause the at least one computer hardware processor to perform a method for use in connection with generating text. The method comprises using at least one computer hardware processor to perform: obtaining a plurality of items of content and associated metadata; and generating a document plan comprising a plurality of rhetorical relations among items of content in the plurality of items of content, the plurality of rhetorical relations comprising a first set of one or more rhetorical relations and a second set of one or more rhetorical relations different from the first set. The generating comprises obtaining a schema specifying the first set of one or more rhetorical relations; and identifying the second set of rhetorical relations based, at least in part, on the associated metadata, wherein the second set of rhetorical relations is not in the schema.

The foregoing is a non-limiting summary of the invention, which is defined by the attached claims.

BRIEF DESCRIPTION OF DRAWINGS

Various aspects and embodiments of the disclosure provided herein are described below with reference to the following figures. It should be appreciated that the figures are not necessarily drawn to scale. Items appearing in multiple figures are indicated by the same or a similar reference number in all the figures in which they appear.

FIG. 6A shows an example of items of content and associated metadata, in accordance with some embodiments of the technology described herein.

FIG. 6B shows an example of a schema specifying a partial rhetorical tree and a global constraint, in accordance with some embodiments of the technology described herein.

FIGS. 6D and 6E illustrate examples of rules for pre-processing concepts of FIG. 6A, in accordance with some embodiments of the technology described herein.

FIGS. 6F and 6G illustrate results of applying the illustrative rules shown in FIGS. 6D and 6E to items of input and associated metadata shown in FIG. 6A, in accordance with some embodiments of the technology described herein.

DETAILED DESCRIPTION

Figure 1:
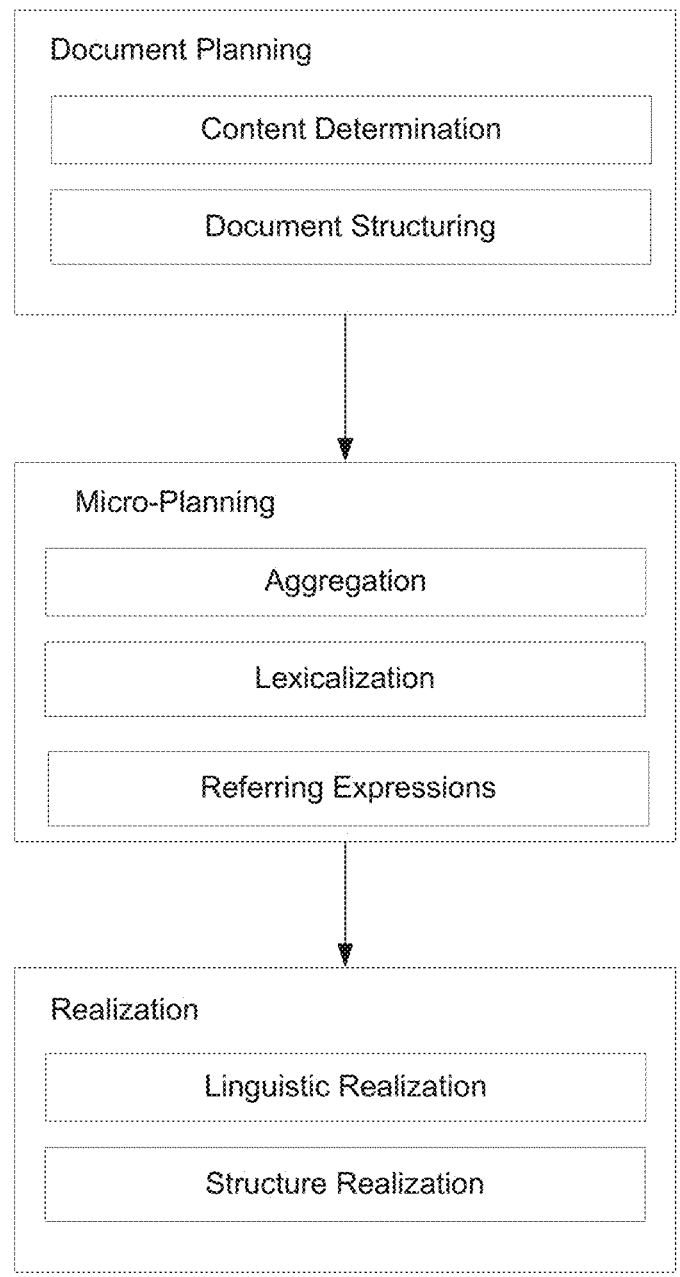
FIG. 1 is a diagram illustrating processing stages of natural language generation performed by some conventional natural language generation systems.

Some conventional natural language generation systems may transform information in non-linguistic form into human language text using multiple stages of processing including a document planning stage, a micro-planning stage, and a realization stage, as illustrated in FIG. 1.

The document planning stage of natural language generation may include a content determination stage during which an NLG system may obtain content to be expressed in natural language text and a document structuring stage for determining the rhetorical structure of the text to be generated during which the NLG system may generate a document plan indicating how the obtained content is to be organized for presentation in the natural language text to be generated. For example, to generate natural language text about the weather, information about the weather may be obtained in the content determination stage (e.g., information indicating the temperature and information indicating the likelihood of rain) and organized for presentation in the document structuring stage (e.g., by determining that information indicating the likelihood of rain should be presented before information indicating the temperature).

The micro-planning stage of NLG may involve determining, based at least in part on the document plan, a syntactic structure for the text to be generated. The micro-planning stage may include an aggregation stage, a lexicalization stage, and a referring expression stage. The aggregation stage may involve determining boundaries between sentences. The lexical choice stage may involve choosing words to describe particular concepts to be expressed in the text to be generated (e.g., determining whether "warm" or "hot" should be used to describe a temperature of 80 degrees). The referring expression stage may involve selecting expressions, for use in the text to be generated, to refer to concepts that appear more than once in the text (e.g., selecting the pronoun "it" to refer to "the weather" in a portion of the text to be generated).

The realization stage of NLG may involve transforming the syntactic structure of the document to be generated into text and may include a linguistic realization stage and a structural realization stage. The linguistic realization stage may involve generating actual text according to rules of syntax, morphology, and orthography, and may include putting words in order, conjugating verbs, ensuring adjective-noun agreement, etc. During the structural realization stage, the text generated in the linguistic realization stage may be output in a desired format (e.g., a PDF file, an XML file, etc.). The above-described tasks may be performed by an NLG system sequentially in stages, as shown in FIG. 1, or in any other suitable way.

The inventors have recognized that document structuring techniques employed by conventional NLG systems can be improved upon. Conventional NLG systems employ either "top-down" or "bottom-up" document structuring techniques. In top-down (or "static") document structuring, content is organized in accordance with one of a small number of pre-defined document plans, each of which specifies a particular order in which content is to be presented. Although this top-down technique is simple and computationally efficient, it is not sufficiently flexible to generate natural language text suitable for use in multiple different circumstances. Bottom up (or "dynamic") document structuring involves performing an exhaustive search over all possible document plans (e.g., searching over different orderings of content) consistent with the semantic meaning of the content to be included in the text to be generated. Although this bottom-up technique is very flexible, it is computationally impractical for all but the simplest NLG tasks.

Accordingly, some embodiments are directed to document structuring techniques that generate a document plan via a combination of static and dynamic techniques. For example, in some embodiments, a document plan for organizing content for presentation in text to be generated may be obtained by: (1) generating a first portion of the document plan based on an existing schema specifying at least a portion of a document plan; and (2) dynamically identifying, based on metadata associated with the content to be organized as part of the document plan, a way to complete the first portion of the document plan in order to generate the complete document plan. Combining a static document structuring technique (e.g., a first portion of the document plan is obtained by using a schema) and a dynamic technique (e.g., searching for at least one feasible way to complete the first portion of the document plan) provides for document structuring techniques that are both computationally efficient and sufficiently flexible to generate natural language text suitable for use in multiple different circumstances.

Some embodiments of the technology described herein address some of the above-discussed drawbacks of conventional techniques for document structuring. However, not every embodiment addresses every one of these drawbacks, and some embodiments may not address any of them. As such, it should be appreciated that aspects of the technology described herein are not limited to addressing all or any of the above-discussed drawbacks of conventional document structuring techniques.

It should also be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Some embodiments and examples of the document structuring technology disclosed herein are described in the context of an NLG system that generates natural language text aimed at persuading readers to purchase one or more products (e.g., a car). However, it should be appreciated that the document structuring techniques described herein are not limited to this application of natural language generation and may be used by an NLG system to generate natural language text of any suitable type for any suitable application.

In some embodiments, an NLG system may obtain content to be expressed as natural language text and metadata associated with the content to be expressed as natural language text, and may generate a document plan specifying the way in which natural language expressing the content is to be organized in the text to be generated by the NLG system. The content may comprise multiple items of content and the document plan may comprise rhetorical relations among the items of content indicating how natural language expressing the items of content is to be organized in text to be generated by the NLG system. The document plan may further comprise the items of content and/or metadata associated with the items of content. Generating the document plan may comprise: (1) identifying, in an existing schema, a first set of one or more rhetorical relations to use in the document plan; and (2) identifying, based on metadata associated with the items of content, a second set of one or more rhetorical relations that is not in the schema to use in the document plan.

An item of content may comprise any suitable content that can be processed by an NLG system to generate natural language text expressing the content. As one non-limiting example, an item of content may comprise information describing a concept, and the information may be processed by an NLG system to generate natural language text expressing the concept. For example, an item of content may comprise information describing the concept that a product (e.g., a car) does not have a particular feature (e.g., a navigation system), and the information may be processed by an NLG system to generate natural language text expressing the concept (e.g., "Unfortunately, the car does not come equipped with a navigation system"). As another non-limiting example, an item of content may comprise data which may be processed by an NLG system to generate natural language text describing the data. For example, an item of content may comprise data indicating it will be 85 degrees on Sunday, which data may be processed by an NLG system to generate "It will be a warm day on Sunday with temperatures rising to 85 degrees."

In some embodiments, an item of content may comprise information indicating one or more reasons for a person (e.g., a reader of the generated text) to perform an action, which information may be processed by an NLG system to generate natural language text describing the reason(s). For example, an item of content may comprise information indicating one or more reasons a person should purchase a product, recommend a product to his/her friends, write a review about the product, fill out a survey, provide information about themselves, download/use an application program, sign up for/use a particular online service, etc. Information indicating one or more reasons for a person to perform an action may comprise information about a subject of the action. For example, information indicating a reason that a person should purchase a product (e.g., a car) may comprise information about the product (e.g., information about one or more characteristics of the product, information about the product likely of interest to a particular reader, etc.).

As may be appreciated from the above examples, an item of content may comprise information in non-linguistic form, which information may be processed by a natural language generation system to produce corresponding natural language text. However, an item of content may comprise linguistic content in addition to or instead of non-linguistic content, as aspects of the technology described herein are not limited in this respect. For example, in some embodiments, an item of content may comprise linguistic content (e.g., one or more words, one or more phrases, etc.) that may be used (e.g., verbatim) by an NLG system when generating natural language text expressing the item of content. As a specific non-limiting example, an item of content may comprise information describing the concept that a car is good for city driving, which information may comprise the language "good for city driving." In turn, this language may be used by an NLG system to generate natural language text such as "this car is actually designed for driving in the city."

In some embodiments, an item of content may be associated with metadata that may be used by an NLG system to generate natural language text expressing the item of content. The NLG system may use the metadata to generate natural language text in any suitable way and, in some embodiments, may use the metadata to generate a document plan for the natural language text to be generated. For example, in some embodiments, an NLG system may obtain a plurality of items of content and corresponding metadata, and generate, based at least in part on the metadata, a document plan for organizing the items of content for presentation in text to be generated by the NLG system. Metadata corresponding to items of content may be obtained from any suitable source(s), as described in more detail below.

Metadata corresponding to an item of content may comprise any of numerous types of information. As one non-limiting example, metadata associated with an item of content may indicate a topic of the item of content. As a specific example, when multiple items of content provide reasons for purchasing a product, metadata associated with one item of content may indicate that the topic of that item of content relates to the price of the product (e.g., the item of content may indicate that the car is on sale) and metadata associated with another item of content may indicate that the topic of that item of content is relates to describing features of the product (e.g., the item of content may comprise information indicating that a car has a navigation system, that the car is black, that the car has over 300 horsepower, and/or any other suitable information).

As another non-limiting example, when an item of content comprises one or more reasons to perform an action, the metadata may comprise information indicating how persuasive the reason(s) may be to readers of natural language text expressing the item of content. In some embodiments, the metadata may comprise information (e.g., a numeric value), determined based at least in part on information about a particular person, indicating how persuasive the reason(s) may be to that person. For example, when an item of content comprises a reason for a person to perform an action (e.g., purchase a product), the reason comprises information about a subject of the action (e.g., the product has a particular characteristic), and information about the person indicates that the person desires a product having the particular characteristic, then the metadata may comprise information indicating that the reason will likely be persuasive to the person (since the reason addresses the person's desire/need). As a specific non-limiting example, when an item of content comprises a reason for a person to purchase a car, the reason indicates that the car has a navigation system, and information about a particular person indicates that person is seeking a car with a navigation system, then the metadata corresponding to the item of content may comprise information indicating that this reason will likely be persuasive to the person (e.g., a numeric value indicating how persuasive the reason will likely be to the person).

In some embodiments, the metadata may comprise information (e.g., a numeric value) indicating how persuasive the reason(s) may be to any person, which information was obtained without using any information about the person. For example, when an item comprises a reason for a person to perform an action (e.g., purchase a product) and the reason comprises information about a subject of the action (e.g., the product has a characteristic/feature that is generally desirable), then the metadata may comprise information indicating that the reason may be persuasive to the person (since the reason points out a generally desirable characteristic feature). In this example, the metadata may comprise information (e.g., a numeric value) indicating how persuasive the reason(s) may be to any person, which information may be intrinsic to the product (e.g., the numeric value may be obtained based on information about the product only and without using any information about what a particular person may find persuasive). As a specific non-limiting example, when an item of content comprises a reason for a person to purchase a car and the reason indicates that the car has high safety rankings, then the metadata corresponding to the item content may comprise information indicating that this reason will likely be persuasive to the person because high safety rankings are generally desirable by consumers (e.g., a numeric value indicating how persuasive the reason will likely be to the person). As another specific non-limiting example, when an item of content comprises a reason for a person to purchase a car, and the reason indicates that the price of the car is lower than that of the official dealer, then the metadata corresponding to the item of content may comprise information indicating that this reason will likely be persuasive to a reader because, regardless of the reader's personal budget, having a price lower than the dealer's price is generally desirable. The information may be a numeric value indicating how persuasive the reason will likely be to the person (e.g., a numeric value indicating how persuasive the reason will likely be to the person).

Information indicative of how persuasive a reason may be to a person may be any suitable type of information. As one non-limiting example, the information may comprise a numeric value in a range (e.g., a value between −1 and 1, between 0 and 1, or any other suitable range) with higher/lower values in the range indicating a greater/lesser degree of persuasiveness. For example, the information indicative of how persuasive a reason may be to a person may a comprise a numeric value between −1 and 1, with positive values reflecting a degree of persuasiveness (e.g., the greater the value, the more persuasive the reason), negative values reflecting a degree of dissuasiveness (e.g., the closer the value to −1 the more dissuasive the reason, and values closer to 0 indicating that the reason is likely to be unpersuasive. For instance, when an item of content comprises information indicating that a car has a navigation system, and information about a person indicates he/she is seeking a car with a navigation system, the metadata corresponding to the item of content may comprise a positive value (e.g., 0.5) indicating that the information in the item of content is likely to be persuasive to the person when natural language text expressing the item of content is presented to the person.

Accordingly, in some embodiments, an item of content may indicate a reason for a person to perform an action and metadata corresponding to the item of content may comprise a first value, determined based at least in part on information about a person, indicative of how persuasive the reason is likely to be to the person. In some examples below, this first value may be referred to as a "user need score." Additionally or alternatively, the metadata corresponding to the item of content may comprise a second value, independent of any information about the person, indicative of how persuasive the reason is likely to be to any person. In some examples below, this second value may be referred to as a "characteristic score." For example, metadata corresponding to an item of content comprising a reason to purchase a car (e.g., "GPS option available") may comprise a first value of 0.5, computed based on information about a particular person indicating the reason is likely to be persuasive because the person desires a car with navigation system, and a second value of 0 indicating that in general having a GPS option would be unpersuasive for buying a car. Additional examples of items of content comprising reasons to purchase a car and associated metadata are shown in FIG. 6A.

As discussed above, an NLG system may obtain multiple items of content and corresponding metadata and generate, based at least in part on the items of content and the metadata, a document plan comprising rhetorical relations among the items of content. A rhetorical relation between two items of content may represent a relationship among the respective meanings of the items of content. An NLG system may generate natural language text expressing to the two or more items of content based, at least in part, on a rhetorical relation that represents the relationship among their respective meanings. A rhetorical relation is not limited to representing the relationship among meanings of two items of content and may represent the relationship among respective meanings of any suitable number of items of content (e.g., three, four, five, ten, etc.), as aspects of the technology described herein are not limited in this respect.

An NLG system may be configured to use any suitable number of rhetorical relations of any suitable type to generate a document plan. For example, an NLG system may be configured to use at least two, at least five, at least ten, between two and ten, and/or any other suitable number of different types of rhetorical relations to generate a document plan.

One non-limiting example of a rhetorical relation is the "Evidence" relation. Two items of content may be related via the Evidence relation when the information in one item of content may be used to provide evidence (e.g., support) for the information in another item of content. As a specific example, the first item of content may comprise information representing the concept that "a car is fast" and the second item of information may comprise information indicating that "the car goes from 0 to 60 in 2.9 seconds." In this example, the first and second items of information may be related via the Evidence relation because the information in the second item of content provides factual support for the assertion in the first item of content. An NLG system may generate natural language text expressing these two items of content and their rhetorical relationship to be "This car is very fast because it goes from 0 to 60 in under three seconds."

Another non-limiting example of a rhetorical relation is the "Violation" relation. Two items of content may be related via the "Violation" relation when dissuasive information in the first item of content may be balanced by persuasive information in the second item of content. As a specific non-limiting example, the first item of content may comprise a reason that would dissuade a person (e.g., a person looking to buy a car with a navigation system and cruise control) from performing an action (e.g., the first item of content may indicate that a particular car does not have a navigation system which would dissuade the person from buying the particular car) and the second item of content may comprise a reason that would persuade the person to perform the action (e.g., the second item of content may indicate that the car has cruise control which would persuade the person to person to buy the particular car). An NLG system may generate natural language text expressing these two items of content and their rhetorical relationship to be "Although this car does not have a navigation system, it does have cruise control."

Another non-limiting example of a rhetorical relation is the "Concession" relation. Two items of content may be related via the Concession relation when persuasive information in the first item of content balances dissuasive information in the second item of content. As a specific non-limiting example, analogous to the example for the Violation relation, the first item of content may comprise a reason that would persuade a person (e.g., a person looking to buy a car with a navigation system and cruise control) from performing an action (e.g., the first item of content may indicate that a particular car has a navigation system) and the second item of content may comprise a reason that would dissuade the person from performing the action (e.g., the second item of content may indicate that the car does not have cruise control). An NLG system may generate natural language text expressing these two items of content and their rhetorical relationship to be "This car has a navigation system even if it does not have cruise control."

Another non-limiting example of a rhetorical relation is the "Join" relation, which allows for the aggregation of items of content. As a specific non-limiting example, two items of content may each describe features of a product (e.g., the first item of content may indicate that a car has anti-lock brakes and the second item of content may indicate that the car has aluminum rims) may be related via the join relation. An NLG system may generated natural language text expressing these two items of content and their rhetorical relationship to be "This car has antilock brakes and aluminum rims."

Another non-limiting example of a rhetorical relation is the "Comment" relation, which allows for the combination of multiple items of content into a single item of content. As a specific non-limiting example, a first item of content (e.g., indicating that a car is black) and a second item of content (e.g., indicating that black is a user's favorite color) may be related by a Comment relation. An NLG system may generate natural language text expressing these two items of content and their rhetorical relationship to be "This car is black, which is your favorite color."

Another non-limiting example of a rhetorical relation is the "List" relation, which allows for aggregation of any suitable number of items of content in an order determined based on metadata associated with the items of content. For example, when the items of content comprise reasons for performing an action and metadata associated with the items of content comprises numerical values indicating a degree of persuasiveness of the reasons, and these items of content are related by a List relation, an NLG system may generate text expressing the items of content in order (e.g., increasing or decreasing) of their persuasiveness.

The above-described examples and other examples of rhetorical relations are described in greater detail below. It should be appreciated that the examples of rhetorical relations provided herein are illustrative and non-limiting, as aspects of the technology described herein may be used with any suitable rhetorical relations.

In some embodiments, a rhetorical relation may be associated with (e.g., defined by) one or more constraints and items of content are related by the rhetorical relation when they satisfy the constraints. Items of content may satisfy one or more constraints associated with a rhetorical relation when metadata associated with the items of content satisfies the constraint(s). Accordingly, items of content may be related by a rhetorical relation when metadata associated with the items of content satisfies the constraint(s) associated with the rhetorical relation. Each rhetorical relation may be associated with any suitable number of constraints of any suitable type, examples of which are provided herein.

As described above, an NLG system may generate a document plan at least in part by identifying one or more rhetorical relations among items of content based, at least in part, on metadata associated with the items of content. Identifying the rhetorical relation(s) among items of content may comprise identifying those relations whose corresponding constraint(s) are satisfied by the items of content obtained by the NLG system to generate natural language text. For example, identifying the rhetorical relation(s) among items of content may comprise determining whether a first item of content and a second item of content satisfy one or more constraints associated with at least one rhetorical relation, the determination being performed based at least in part on metadata associated with the first item content and the second item of content.

In some embodiments, a rhetorical relation may be associated with one or more constraints that items of content must satisfy in order to be related via the rhetorical relation. Such constraints may be referred to as "strong" constraints. Additionally or alternatively, a rhetorical relation may be associated with one or more constraints that items of content may satisfy in order to be related via the rhetorical relation. Such constraints may be referred to as "weak" constraints. As discussed in more detail below, the document plan generated by an NLG system may satisfy one or more of the weak constraints if, for example, no document plan satisfying all the weak constraints may be identified. Accordingly, when a rhetorical relation is associated with one or more strong constraints and/or one or more weak constraints, items of content are said to satisfy the rhetorical relation when they satisfy the strong constraint(s) and, optionally, one or more of the weak constraints.

As one non-limiting example of a constraint associated with a rhetorical relation, the Concession relation may be associated with a constraint that items of content related by the Concession relation are about the same topic. When metadata associated with two items of content indicates that each of the items of content relates to a same topic (e.g., a feature of a product, price of a product, etc.), the items of content satisfy the "topic" constraint and may be related via the Concession relation (subject to satisfying one or more additional constraints when the Evidence relation is associated with additional constraint(s)). This constraint may be a strong constraint.

As another non-limiting example of a constraint associated with a rhetorical relation, the Violation relation may be associated with a constraint which indicates that for a first item of content and a second item of content to be related via the Violation relation, metadata associated with the first item of content is to indicate that the first item of content comprises dissuasive information (e.g., a reason that would dissuade a person from performing an action such as purchasing a product)) and metadata associated with the second item of content indicate that the second item of content comprises persuasive information (e.g., a reason that would persuade a person to performing the action such as purchasing the product). In the above example of a person who is looking for a car having a navigation system and cruise control, for instance, metadata associated with a first item of content (e.g., the first item indicating that a particular car does not have a navigation system) may comprise a user need value less than 0 and the second item of content (e.g., the second item of content indicating that the particular has cruise control) may comprise a user need value greater than 0 (indicating that the second item of content is persuasive to the user). This constraint may be a strong constraint.

As yet another non-limiting example of a constraint associated with a relation, the Violation relation may be associated with a weak constraint which indicates that for a first item of content and a second item of content to be related via the Violation relation, metadata associated with the first and second items of content indicates that, when taken together, the first and second items of content would be persuasive to a user (to avoid pairing a very dissuasive reason with a weakly persuasive reason). This may be expressed by the constraint that the sum of the user need values of the first and second items be positive. As another non-limiting example of a constraint associated with a relation, the Violation relation may be associated with a weak constraint which indicates that for a first item of content and a second item of content to be related via the Violation relation, metadata associated with the items of content is to indicate that the first and second items of content have the same topic. Additional examples of constraints associated with rhetorical relations, including the above-described and other rhetorical relations (e.g., the "Comment" relation, etc.), are provided below.

As discussed above, an NLG system may generate a document plan to organize multiple items of content for presentation in natural language text at least in part by identifying multiple rhetorical relations among the items of content. In some embodiments, identifying multiple rhetorical relations among the items of content may comprise generating a hierarchy of rhetorical relations among the items of content.

In some embodiments, the hierarchy of rhetorical relations may comprise a tree and the data structure(s) encoding the hierarchy of rhetorical relations may encode the tree. The tree may comprise a root node associated with a rhetorical relation, one or more internal nodes associated with at least one rhetorical relation (e.g., each of the one or more internal nodes may be associated with a respective rhetorical relation), and a plurality of leaf nodes associated with at least one of the items of content (e.g., each of the plurality of leaf nodes may be associated with a respective item of content). The tree may be a binary tree or any other suitable type of tree, as aspects of the technology described herein are not limited in this respect. The tree may be referred to as a "rhetorical" tree.

Figure 2:
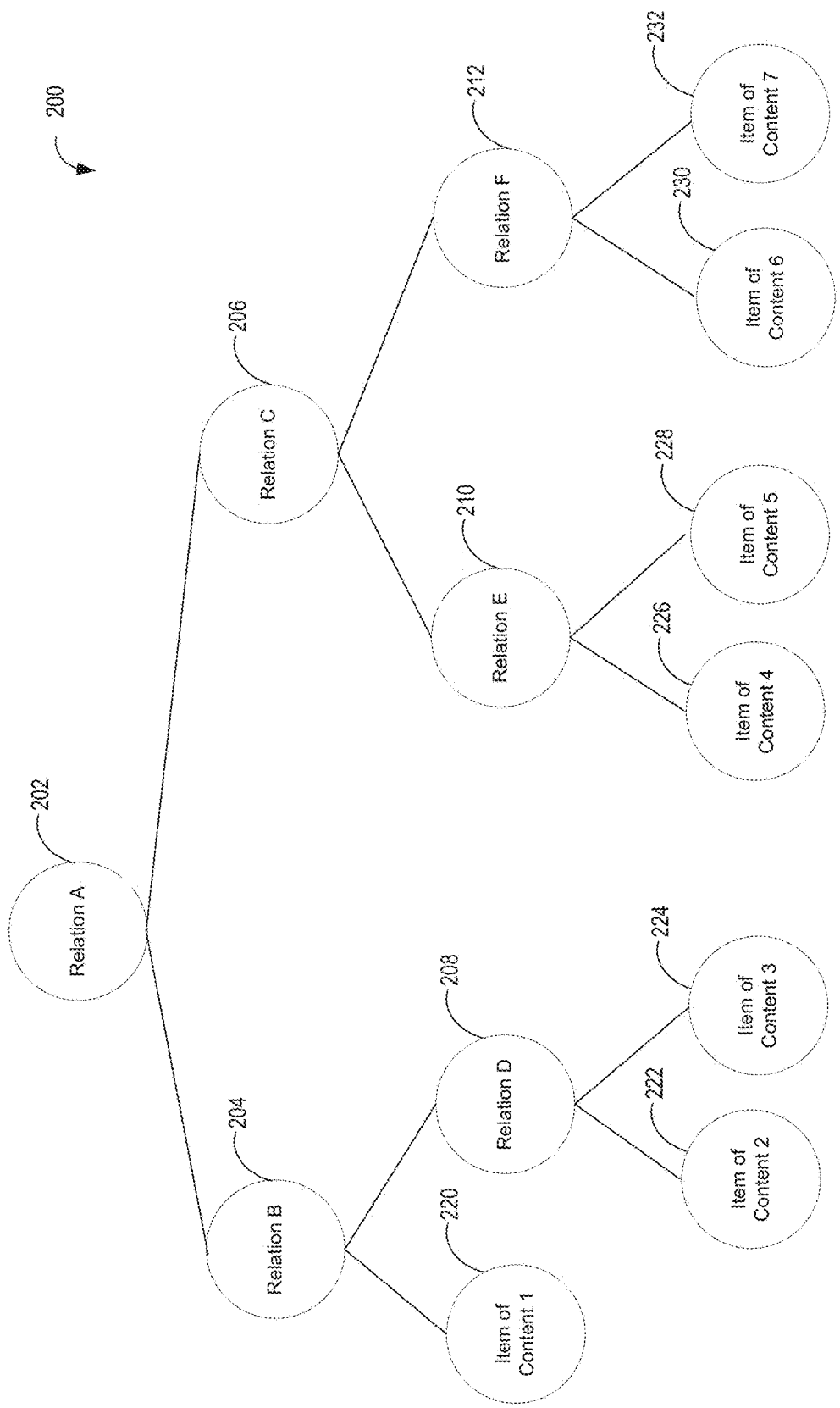
FIG. 2 is a diagram of an illustrative hierarchy of rhetorical relations, in accordance with some embodiments of the technology described herein.

One non-limiting example of a hierarchy of rhetorical relations comprising a tree is shown in FIG. 2, which shows an illustrative hierarchy 200 of rhetorical relations comprising root node 202, internal nodes 204-212, and leaf nodes 220-232. The root and internal nodes are associated with respective rhetorical relations A-F (each of which may be any suitable type of rhetorical relation). Leaf nodes 220-232 are associated with items of content 1-7 (each of which may be any suitable type of item content). Each of the items of content 1-7 may be associated with respective metadata (not shown in FIG. 2).

In some embodiments, a rhetorical relation in a hierarchy of rhetorical relations may relate two items of content, an item of content and another rhetorical relation, or two rhetorical relations. For example, when the hierarchy of rhetorical relations comprises a tree, a rhetorical relation associated with an internal node in the tree may relate the item(s) of content and/or the rhetorical relation(s) associated with the child nodes of the internal node. As a non-limiting example, as shown in FIG. 2, the rhetorical relation associated with internal node 208 (i.e., relation D) relates the two items of content associated with leaf nodes 222 and 224 (i.e., item of content 2 and item of content 3). As another example, the rhetorical relation associated with internal node 204 (i.e., relation A) relates the item of content associated with leaf node 220 (i.e., item of content 1) and the rhetorical relation associated with internal node 208 (i.e., relation D). As another example, the rhetorical relation associated with root node 202 (i.e., relation A) relates the rhetorical relations associated with child nodes 204 (i.e., relation B) and 206 (i.e., relation C).

As may be appreciated from the illustrative hierarchy of rhetorical relations shown in FIG. 2, an NLG system may generate a hierarchy of rhetorical relations by identifying rhetorical relations among items of content, among items of content and rhetorical relations, and among rhetorical relations. For example, when the hierarchy of rhetorical relations comprises a binary tree (e.g., as shown in FIG. 2), generating the hierarchy may comprise identifying a rhetorical relation between two items of content (e.g., for any two items of content), between an item of content and a rhetorical relation (e.g., for any item of content and any rhetorical relation), and/or between two rhetorical relations (e.g., any two rhetorical relations).

As discussed above, an NLG system may identify a rhetorical relation between two items of content by identifying at least one rhetorical relation whose associated constraints are satisfied by (e.g., the metadata associated with) the two items of content. Accordingly, items of content related by a rhetorical relation in a hierarchy of rhetorical relations satisfy the constraints associated with the rhetorical relation. For example, the items of content associated with leaf nodes 222 and 224 are shown as being related by rhetorical relation D and, as such, these items of content satisfy at least the strong constraints associated with rhetorical relation D (if any) and, optionally, one or more of the weak constraints associated with rhetorical relation D (if any). As another example, the items of content associated with leaf nodes 226 and 228 are shown as being related by rhetorical relation E and, as such, these items of content satisfy the constraints associated with rhetorical relation E.

In order for the NLG system to identify a rhetorical relation between an item of content and a particular rhetorical relation, the particular rhetorical relation may be associated (e.g., by the NLG system) with a virtual item of content (also termed "head" of the relation) that represents the particular rhetorical relation, and the NLG system may identify a rhetorical relation between the item of content and the particular rhetorical relations by identifying at least one rhetorical relation whose associated constraint(s) are satisfied by the item of content and the virtual item of content Like an item of content, a virtual item of content may be associated with metadata that may be used to determine whether the virtual item of content satisfies one or more constraints associated with one or more rhetorical relations. Accordingly, when an item of content and a particular rhetorical relation are related by a rhetorical relation in a hierarchy of rhetorical relations, the item of content and the virtual item of content representing the particular rhetorical relation satisfy the constraints associated with the rhetorical relation. For example, the item of content associated with leaf node 220 (i.e., item of content 1) and the rhetorical relation associated with internal node 208 (i.e., rhetorical relation D) are shown as being related by rhetorical relation B (associated with internal node 204) and, as such the item of content 1 and the virtual item of content representing rhetorical relation D satisfy the constraints associated with rhetorical relation B. A virtual item of content may be represented by any suitable data structure which may store information associated with the virtual item of content (e.g., metadata associated with the virtual item of content).

Similarly, an NLG system may identify a rhetorical relation between two rhetorical relations by identifying at least one rhetorical relation whose associated constraint(s) are satisfied by the virtual items of content representing the two rhetorical relations. Accordingly, when two rhetorical relations are related by a particular rhetorical relation in a hierarchy of rhetorical relations, the virtual items of content representing the two rhetorical relations satisfy the constraint(s) associated with the particular rhetorical relation. For example, the rhetorical relations E and F associated with internal nodes 210 and 212, respectively, are shown as being related via rhetorical relation C associated with internal node 206 and, as such, the virtual items of content representing rhetorical relations E and F satisfy the constraints associated with rhetorical relation C. As another example, the rhetorical relations B and C associated with internal nodes 204 and 206, respectively, are shown as being related via rhetorical relation A associated with the root node 202 and, as such, the virtual items of content representing rhetorical relations B and C satisfy the constraints associated with rhetorical relation C.

In some embodiments, a rhetorical relation may be represented by a virtual item of content obtained based, at least in part, on the items of content (virtual and/or not virtual) related by the rhetorical relation. For example, rhetorical relation D associated with internal node 208 may be represented by a virtual item of content generated based, at least in part, on the items of content 2 and 3 associated with leaf nodes 222 and 224, respectively. As another example, rhetorical relation B associated with internal node 204 may be represented by a virtual item of content generated based, at least in part, on the item of content 1 associated with leaf node 220 and the virtual item of content representing relation D, which itself may have been generated based at least in part on the items of content that are related by relation D. As yet another example, rhetorical relation A associated with root node 202 may be represented by a virtual item of content generated based, at least in part, on the virtual items of content associated with relations B and C associated with child nodes 204 and 206 of the root node. As may be seen from these examples, a virtual item of content representing a rhetorical relation (e.g., rhetorical relation B) in a rhetorical tree may be obtained (e.g., recursively) based on items of content in a subtree of the rhetorical tree rooted at the internal node corresponding to the rhetorical relation (e.g., items of content 1-3).

A virtual item of content representing a rhetorical relation and metadata associated with the virtual item of content may be obtained from the items of content related by the rhetorical relation and metadata associated with the items of content in any suitable way. In some embodiments, a virtual item of content representing a rhetorical relation may be obtained in a manner that depends on the type of the rhetorical relation (e.g. a virtual item of content representing a Join relation may be obtained in different way from the way in which a virtual of content representing a Violation relation is obtained).

In some embodiments, a virtual item of content representing a rhetorical relation may be the same as one of the items of content related by the rhetorical relation, and may be associated with the same metadata as the one item of content. For example, the virtual item of content representing relation F associated with internal node 212 may be the same as item of content 6 associated with leaf node 230 and may be associated with the same metadata that item of content 6 is associated with. As one specific non-limiting example, a virtual item of content representing the Evidence rhetorical relation that relates a first item of content comprising an assertion (e.g., "a car is fast) and second item of content comprising information providing factual support for the first item of content (e.g., "the car goes from 0 to 60 in 2.9 seconds") may be the same as the first item of content and the metadata associated with the virtual item of content may be the same as the metadata associated with the first item of content.

In some embodiments, a virtual item of content representing a rhetorical relation may be obtained by combining the items of content related by the rhetorical relation, and the metadata associated with the virtual item of content may be obtained by combining the metadata associated with the items of content related by the rhetorical relation. For example, the virtual item of content representing relation D may be obtained by combining the items of content 2 and 3, and the metadata associated with the virtual item may be obtained by combining metadata associated with items of content 2 and 3.

Two items of content related by a relation and their associated metadata may be combined in any suitable way to obtain a virtual item of content and associated metadata. The virtual item of content may comprise information from either one or both of the items of content. The metadata associated with the virtual item of content may comprise and/or be computed from metadata associated with either one or both of the items of content. For example, when metadata associated with first and second items of content related by a rhetorical relation comprise respective numeric values (e.g., the items of content comprise reasons for a person to perform an action and the numeric values indicate the degree of persuasiveness of the reasons), the metadata associated with the virtual item of content representing the rhetorical relation may comprise a value computed based on (e.g., as a sum or any other suitable function of) these numeric values. As one specific non-limiting example, metadata associated with a virtual item of content representing the Violation rhetorical relation that relates a first item of content comprising a persuasive reason to perform an action and a second item of content comprising a dissuasive reason to perform the action may be obtained, at least in part, by computing by adding the numeric value indicating the persuasiveness and dissuasiveness of the reasons in the first and second items of content. Details for how virtual items of content and associated metadata may be computed for specific relations (e.g., Join relation, Evidence relation, Violation relation, Concession relation, etc.) are provided below, though it should be appreciated that such examples are non-limiting, as a virtual item of content representing a rhetorical relation and associated metadata may be obtained from the items of content related by the rhetorical relation (and their respective metadata) in any suitable way.

As described above, in some embodiments, an NLG system may receive multiple items of content and associated metadata and generate a document plan comprising a plurality of rhetorical relations among the items of content, the document plan specifying the way in which natural language expressing items of content is to be organized in the text to be generated by the NLG system. Generating the document plan may comprise: (1) identifying a first set of one or more rhetorical relations among the items of content based, at least in part, on a schema specifying at least a portion of the document plan; and (2) identifying a second set of one or more rhetorical relations among the items of content, based on metadata associated with the items of content, where the second set of rhetorical relations is not in the schema.

In some embodiments, a schema specifying at least a portion of the document plan may specify one or more rhetorical relations to be used as part of the document plan. In embodiments where generating the document plan comprises generating a hierarchy of rhetorical relations, the schema may specify one or more rhetorical relations to be used as part of the hierarchy of relations. For example, when the hierarchy of rhetorical relations comprises a rhetorical tree (e.g., as illustrated in FIGS. 2 and 6C), the schema may specify one or more rhetorical relations to be used in the rhetorical tree and where in the tree they are to be used. As one non-limiting example, a schema may specify a rhetorical relation to be associated with a root node of the rhetorical tree (see e.g., the schema illustrated in FIG. 5A that specifies that the Violation relation is to be associated with a root node of any rhetorical tree generated to be part of the document plan). As another non-limiting example, a schema may specify that the root node be associated with a Violation relation and that at least one child node of the root node be associated with a Join relation.

In some embodiments, a schema specifying at least a portion of the document may comprise one or more constraints on the document plan to be generated. In embodiments where generating the document plan comprises generating a rhetorical tree, the schema may specify one or more constraints on the structure of the rhetorical tree. For example, a schema may specify that a rhetorical tree is to include at least one node associated with a particular type of relation (e.g., a schema may specify that rhetorical tree is to include at least one node associated with the Evidence relation). As another example, a schema may specify that a node associated with one type of relation (e.g., the Join relation) cannot be a child node of node associated with the same type of relation.

In some embodiments, an NLG system may generate a document plan comprising a first set of one or more rhetorical relations specified by a schema and a second set of one or more other rhetorical relations among the items of content, the second set of rhetorical relation is identified by the NLG system based, at least in part, on metadata associated with the items of content. The second set of rhetorical relations may be identified by searching for a set of rhetorical relations to complete the first set of rhetorical relations so that the constraints associated with all of the rhetorical relations in the document plan are satisfied by the items of content and/or rhetorical relations related by the rhetorical relations. In embodiments where generating a document plan comprises generating a hierarchy of relations, a portion of the hierarchy may be specified by a schema and the NLG system may generate the rest of the hierarchy by identifying one or more other rhetorical relations to complete the hierarchy so that the constraints associated with all the rhetorical relations in the hierarchy are satisfied.

As one non-limiting example, when the hierarchy of rhetorical relations comprises a rhetorical tree, the NLG system may determine a portion of the rhetorical tree by using a schema (e.g., identify the rhetorical relation to use as the root node of the rhetorical tree) and determine the rest of the rhetorical tree by searching for a set of rhetorical relations to complete the determined portion of the rhetorical tree such that at least a portion of each item of content is associated with a leaf node in the rhetorical tree and all the constraints associated with the rhetorical relations in the tree are satisfied.

The search may be performed in any suitable way and, for example, may be performed by searching among rhetorical trees consistent with the rhetorical relations identified from the schema (e.g., searching among all rhetorical trees having a root node associated with the rhetorical relation specified by the schema) until a feasible rhetorical tree is found such that all the strong constraints (and, optionally, one or more weak constraints) associated with rhetorical relations in the feasible tree are satisfied. The search may be performed in any suitable way and, in some embodiments, may be performed using a technique for solving combinatorial optimization and/or constraint satisfaction problems.

Figure 5A:
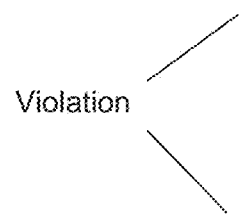
FIG. 5A illustrates a schema specifying a partial rhetorical tree, in accordance with some embodiments of the technology described herein.
Figure 5B:
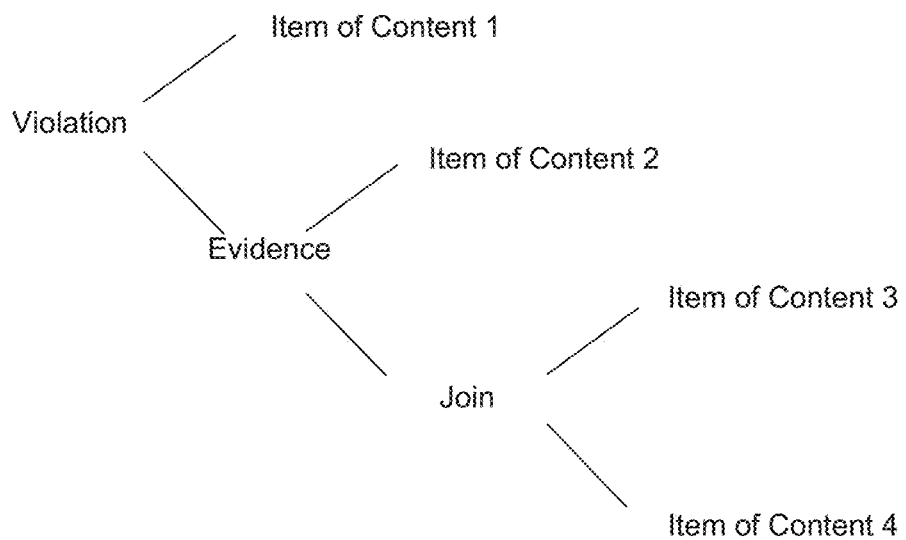
FIG. 5B illustrates an example of how the partial rhetorical tree of FIG. 5A may be completed to form a rhetorical tree representing a document plan, in accordance with some embodiments of the technology described herein.
Figure 6C:
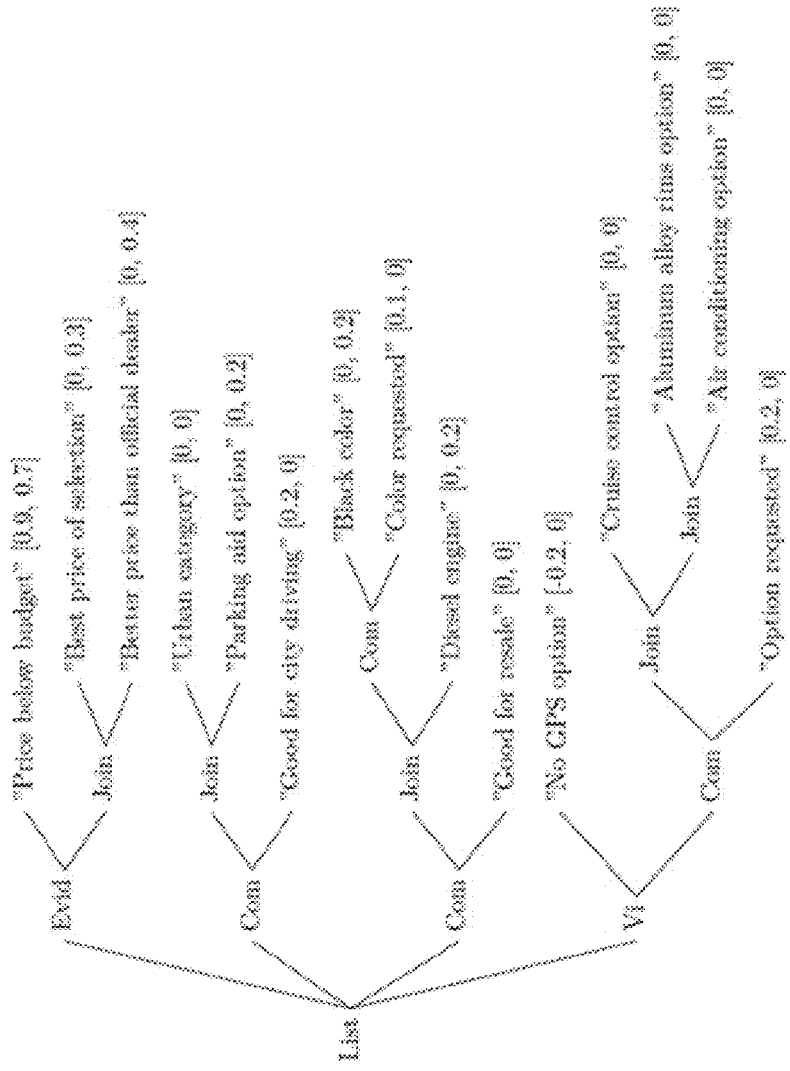
FIG. 6C illustrates a document plan that may be generated using the items of content shown in FIG. 6A and schema of FIG. 6B, in accordance with some embodiments of the technology described herein.

As a specific non-limiting example, the NLG may obtain four items of content with associated metadata, identify based on the schema shown in FIG. 5A that the root node of the rhetorical tree is to be associated with a Violation relation and identify, based at least in part on the metadata, two additional rhetorical relations to complete the rhetorical tree so that each of the four items of content is associated with a leaf node of the rhetorical tree and so that the constraints associated with all the rhetorical relations in the rhetorical tree are satisfied. An example rhetorical tree resulting from this process is shown in FIG. 5B. The root node of the rhetorical tree is associated with the Violation relation (as specified by the schema shown in FIG. 5A), and the other two internal nodes are associated with the Evidence and Join relations, which were identified by the NLG system to complete the tree. Any constraints associated with the Violation, Evidence, and Comment relations are satisfied by the rhetorical tree shown in FIG. 5B.

Figure 3:
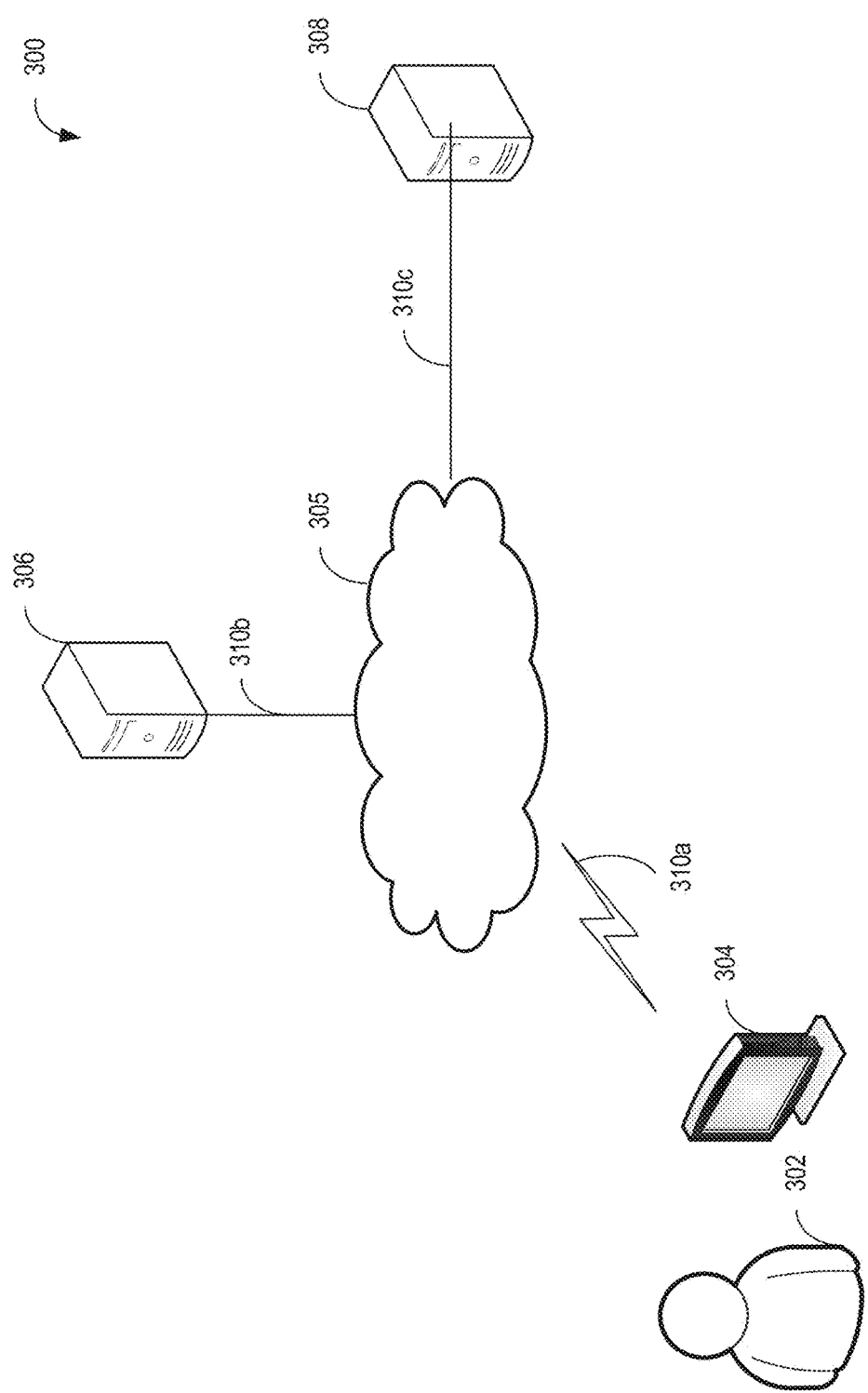
FIG. 3 illustrates an environment in which some embodiments of the technology described herein may operate.

FIG. 3 illustrates an environment 300 in which some embodiments of the technology described herein may operate. In the environment 300, user 302 may use computing device 304 to interact, via network 305, with system 306 (e.g., via a website hosted by system 306 and/or in any other suitable way). System 306 may obtain information from the user and present to the user natural language text generated based at least in part on the information provided by the user. The natural language text may be generated at least in part by using natural language generation system 308.

In some embodiments, system 306 may comprise a product recommendation system configured to recommend one or more products (e.g., a car) to user 302 based, at least in part, on information obtained from user 302. User 302 may provide information to the product recommendation system (e.g., via a website accessed using computing device 304) indicating the type of product the user is seeking. For example, the user may indicate his/her budget for buying the product and one or more features the user would like the product to have. In response, system 306 may provide personalized natural language text to user 302 concerning one or more products (e.g., recommending that the user purchase one or more products). As a specific non-limiting example, the product recommendation system may be configured to recommend cars and user 302 may provide input to the product recommendation system (e.g., via a website of an auto dealership, a car seller, a car manufacturer, etc.) indicating the user's budget for buying a car and one or more features the user would like the car to have. In response, system 306 may provide personalized natural language text to the user recommending a car for the user to buy.

The natural language text provided by system 306 to user 302 may be generated by natural language generation system 308. To this end, system 306 may provide information to NLG system 308 that may be used by NLG system to 308 generate the natural language text. In some embodiments, system 306 may identify, based at least in part on information provided by the user, one or more items of content to be expressed as natural language text and may provide the item(s) of content to the NLG system 308 to use for generating natural language text. This may be done in any suitable way. For example, information provided by the user may indicate characteristics of a product that the user is seeking to purchase (e.g., characteristics of a car the user seeks to purchase), and system 306 may identify one or more items of content associated with the product having the characteristics sought by the user (e.g., one or more items of content associated with a car having at least some of the characteristics the user would like a car to have) and provide the identified item(s) of content to NLG system 308 so that the NLG system may generate natural language text expressing these items of content. The identified items of content may comprise any suitable information and, for example, may comprise one or more reasons for why the user should purchase the product.

As a specific non-limiting example, the user 302 may provide input indicating that he is seeking a black car in a particular price range that is suitable for city driving, has a navigation system, cruise control, and aluminum alloy wheels. In response, system 306 may identify a car whose characteristics at least partially match those requested, and identify items of content (e.g., from among items of content in a database or in any other suitable way) to use for describing and/or recommending the identified car to user 302. The items of content may include any suitable information and, for example, may include one or more reasons for why the user should purchase the identified car. For instance, system 306 may identify the items of content shown in FIG. 6A as the items of content to use for generating natural language text and provide these items of content to NLG system 308 so that the NLG system may generate natural language text expressing these items of content.

In some embodiments, in addition to providing to NLG system 308 the items of content to be expressed using natural language text, system 306 may provide to the NLG system 308 other information that NLG system 308 may use for generating natural language text expressing the items of content. For example, system 306 may provide to NLG system 308 metadata associated with each of one or more of the items of content. For example, when an item of content comprises a reason for why the user should purchase a product, the metadata associated with the item of content may comprise information indicating how persuasive the reason would be to the user. Examples of such metadata information are described herein. As another example, the metadata may comprise information indicating a topic of each of the items of content. FIG. 6A also illustrates metadata associated with the illustrative items of content that may be provided by system 306 to NLG system 308.

In some embodiments, system 306 may generate automatically at least some of the metadata provided to NLG system 308. This may be done in any suitable way and, in some embodiments, system 306 may automatically generate at least some of the metadata provided to NLG system 308 based on information obtained from user 302. For example, system 306 may automatically generate metadata for an item of content comprising a reason the user should purchase a product by computing, based on information provided by a user, a numeric value indicating how persuasive the item of content is likely to be to the user when expressed in natural language text. For example, when an item of content comprises information indicating that the car being recommended has a navigation system, as the user requested, system 306 may compute a numeric value indicating that the item of content is likely to be persuasive to a user. As another example, when an item of content comprises information indicating that the car being recommended does not have aluminum alloy wheels, even though the user requested them, system 306 may compute a numeric value indicating that the item of content is likely not going to be persuasive to the user and may actually dissuade the user from purchasing the car.

In some embodiments, at least some of the metadata provided by system 306 to NLG system 308 may be generated manually. For example, as discussed above, metadata associated with an item of content may comprise information indicating the topic of the information in the item of content, which topic may have been identified manually.

NLG system 308 may obtain, from system 306, items of content and associated metadata, and generate natural language text expressing the items of content. This may be done in any suitable way. For example, NLG system may generate a document plan in accordance with embodiments described herein (e.g., for example in accordance with process 400 described below with reference to FIG. 4), and generates natural language text for presentation to the user 302 in accordance with the document plan. As a specific non-limiting example, the NLG system 308 may generate the document plan shown in FIG. 6C based, at least in part, on the items of content and associated metadata shown in FIG. 6A.

The NLG system 308 may generate natural language text in accordance with the document plan in any suitable way, as aspects of the technology described herein are not limited by the way in which an NLG system may generate natural language text based on a document plan. For example, NLG system 308 may generate natural language text in accordance with the document plan by performing one or more of the following stages of processing: aggregation, lexicalization, identifying referring expressions, linguistic realization, and structure realization, which have been described above with reference to FIG. 1. After NLG system 308 generates natural language text, the NLG text may be provided to user 302 (e.g., via system 306).

As a specific non-limiting example, the NLG system may generate the following natural language text based, at least in part, on the items of content shown in FIG. 6A and the document plan shown in FIG. 6C:

"At more than $2,500 below your budget, this car's price is simply unbeatable! It is the cheapest we can offer, and we sell it for $3,000 less than the official dealer does. Additionally, you live in a big city, and this model is actually designed for driving in a city; for example, it has a parking aid, which is very useful when you need to back in small spaces. It is black (your favorite color!), and it takes diesel: both features are ideal if you ever want to resell the car. Unfortunately, it does not have a GPS; however, it is equipped with cruise control and aluminum alloy wheels, which you specifically requested."

In the illustrative environment 300, computing device 304 may be a portable device (e.g., a smart phone, a tablet computer, a laptop, etc.), a fixed device (e.g., a desktop computer, a rack-mounted computer, etc.), and/or any computing device that user 302 may use to interact with system 306. System 306 may comprise any suitable computing device(s) (e.g., one or more processors, one or more servers, etc.), as aspects of the technology described herein are not limited in this respect. NLG system 308 may comprise any suitable computing device(s) (e.g., one or more processors, one or more servers, etc.) as aspects of the technology described herein are not limited in this respect.

In the illustrative environment 300, computing device 304, system 306, and NLG system 306 are communicatively coupled via network 305 and communication links 310*a*, 310*b*, and 310*c*. Network 305 may be any suitable type of network such as a local area network, a wide area network, the Internet, an intranet, or any other suitable network. Communication links 310*a*, 310*b*, and 310*c* may be any suitable types of connection (wired, wireless, etc.), as aspects of the technology described herein are not limited in this respect.

Figure 4:
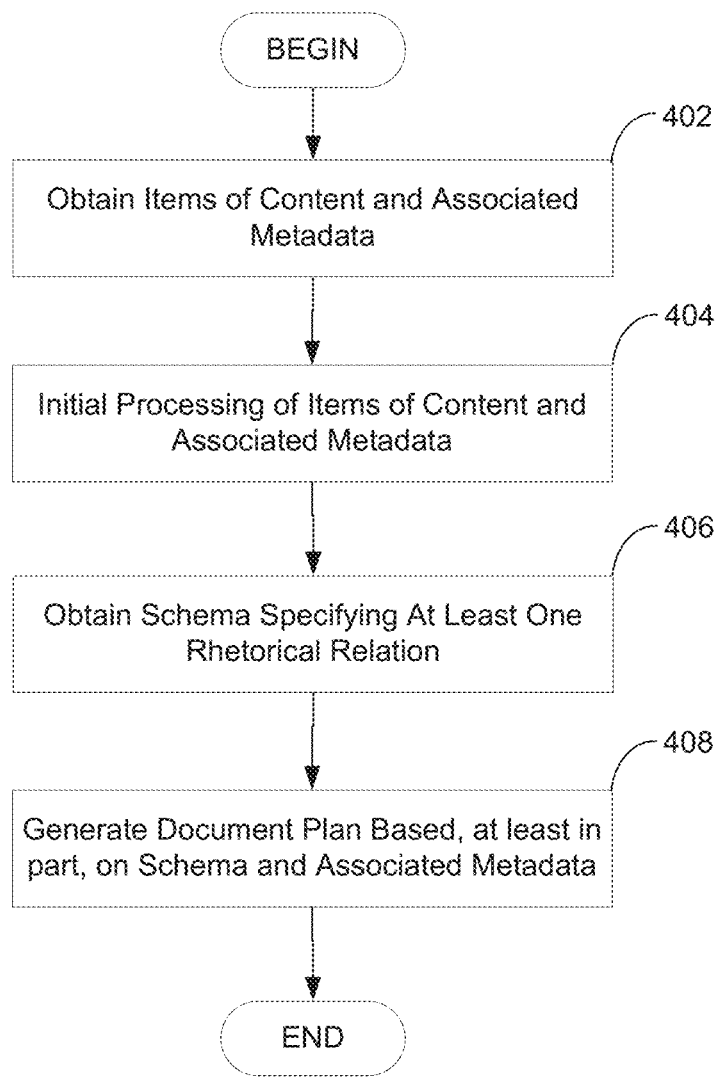
FIG. 4 is a flow chart of an illustrative process for generating a document plan, in accordance with some embodiments of the technology described herein.

FIG. 4 is a flowchart of an illustrative process 400 for generating a document plan for expressing multiple items of content using natural language text. Process 400 may be performed by any suitable natural language generation system and, for example, may be performed by using NLG system 308 described with reference to FIG. 3. Aspects of process 400 are described below with reference to FIGS. 6A-6E which illustrate how a document plan comprising a rhetorical tree (as shown in FIG. 6C) may be generated based at least in part on items of content (as shown in FIG. 6A), metadata associated with the items of content (as shown in FIG. 6A), and a schema at least partially specifying the document plan (as shown in FIG. 6B).

Process 400 begins at act 402, where the NLG system executing process 400 obtains multiple of items of content and associated metadata. The NLG system may obtain the items of content and associated metadata from any suitable source and, for example, from system 306 (which may be a product recommendation system in some embodiments) described with reference to FIG. 3. The NLG system may obtain any suitable number of items of content (e.g., at least two items of content, at least five items of content, at least ten items of content, at least twenty-five items of content, between five and twenty-five items of content, between five and fifty items of content, between twenty five and one hundred items of content, etc.), as the document structuring techniques described herein are not limited by the number of items of content to organize as part of a document plan.

An item of content may comprise any suitable content that can be processed by an NLG system to generate natural language text expressing the content. For example, an item of content may comprise information indicating one or more reasons for a person to perform an action (e.g., purchase a product) and/or any other suitable information examples of which have been provided. As described above, an item of content may comprise information in non-linguistic and/or linguistic form.

Metadata associated with an item of content may comprise any suitable information that may be used by an NLG system to generate natural language text expressing the item of content. For example, as described above, when an item of content comprises one or more reasons to perform an action, the metadata may comprise information indicating how persuasive the reason(s) may be to readers of natural language text expressing the item of content. Additionally or alternatively, metadata associated with an item of content may comprise any other suitable information, examples of which have been provided.

FIG. 6A shows a non-limiting example of items of content and associated metadata that may be received at act 402 by an NLG system executing process 400. The items of content shown in FIG. 6A comprise information that may be used to generate natural language text for recommending a car to a user. Each of the items of content indicates a reason for the user to purchase a car. The metadata associated with each of the items of content may indicate how persuasive the reason indicated by the item of content may be to the user (e.g., the metadata may indicate whether the reason is persuasive, unpersuasive, or dissuasive). Examples of such metadata are provided herein. As shown, the metadata comprises two numeric values for each of the items of content. The first numeric value for an item of content is determined, based at least in part on information about the user (e.g., what characteristics of a car the user desires), and may indicate how persuasive the information in the item of content is to the user. The second numeric value for an item of content is determined independent of any information about the user and may indicate how persuasive the information in the item of content is to the user.

Next process 400 proceeds to act 404, where the items of content and associated metadata, obtained at act 402, may be processed to obtain additional information, which may be used to determine whether particular items of content are related by one or more rhetorical relations. As discussed above, two items of content may be related by a rhetorical relation when they satisfy the constraint(s) associated with the rhetorical relation, and determining whether two items of content satisfy the constraint(s) associated with a particular rhetorical relation may be performed by using the additional information derived at act 404. For example, as discussed in more detail below in Section II, constraints associated with some relations depend on one or more predicates, which predicates may be derived during act 404 by application of one or more rules or in any other suitable way. As a non-limiting example, FIGS. 6D and 6E illustrate examples of rules that may be used to processing the items of content and associated metadata shown in FIG. 6A. FIGS. 6F and 6G illustrate results of applying the illustrative rules shown in FIGS. 6D and 6E to items of input and associated metadata shown in FIG. 6A.

Next process 400 proceeds to act 406, where the NLG system obtains a schema that the system will use to generate the document plan. The schema may specify one or more rhetorical relations to be used as part of the document plan. For example, as discussed above, when generating the document plan comprises generating a hierarchy of rhetorical relations among the items of content obtained at act 402 (e.g., generating a rhetorical tree having leaf nodes associated with the items of content), the schema may specify one or more rhetorical relations to be used in the hierarchy of rhetorical relations and where in the hierarchy they are to be used (e.g., by specifying a rhetorical relation to be associated with a root node of the rhetorical tree, one or more rhetorical relations to be associated with one or more internal nodes of the rhetorical tree, etc.). In this way, the schema may specify a partial rhetorical tree that may be completed to generate the rhetorical tree representing the document plan.

Additionally, the schema may specify one or more constraints on the document plan generated. As discussed above, when generating the document plan comprises generating a rhetorical tree, the schema may specify one or more constraints on the structure of the rhetorical tree. For example, a schema may specify that a rhetorical tree is to include at least one node associated with a particular type of relation (e.g., a schema may specify that rhetorical tree is to include at least one internal node associated with the Violation relation).

The NLG system executing process 400 may obtain a schema in any suitable way and from any suitable source, as aspects of the technology provided herein are not limited in this respect. For example, the NLG system may obtain the schema from the same source from which the NLG system obtained the items of content and associated metadata at act 402 (e.g., system 306). As another example, the NLG system may have access to a set of one or more different schemas to use for generating document plans and, at act 406, may obtain a schema by selecting a schema from the set of schemas to use for generating the document plan for the items of content obtained at act 402. The selection may be performed in any suitable way and, for example, may be performed based at least in part on the items of content and associated metadata received at act 402. For example, when the items of content comprise one or more reasons for performing an action and the metadata associated with the items of content indicates the persuasiveness of the reasons, a schema specifying that the hierarchy of rhetorical relations should comprise a List relation at the top level of the hierarchy, which would induce the presentation of items of content in increasing or decreasing order of their persuasiveness.

FIG. 6B shows a non-limiting example of a schema specifying a partial rhetorical tree and a global constraint that may be used by an NLG system for generating a rhetorical tree as part of a document plan for organizing the items of content shown in FIG. 6A. The schema specifies a partial rhetorical tree having a root node associated with a List relation and a child of the root node associated with a Violation relation. Additionally, the schema indicates that the rhetorical tree representing is to comprise at least one Evidence relation.

Next, process 400 proceeds to act 408, where the NLG generates the document plan based, at least in part, on the schema obtained at act 406 and metadata associated with the items of content obtained at act 402.

In some embodiments, generating the document plan may comprise: (1) determining, using the schema, a portion of the document plan comprising a first set of one or more rhetorical relations; and (2) determining the rest of the document plan by identifying (e.g., by searching for) one or more rhetorical relations to complete the determined portion of the document plan so that the constraints associated with all of the rhetorical relations in the document plan are satisfied by the items of content and/or rhetorical relations related by the rhetorical relations. In embodiments where generating a document plan comprises generating a hierarchy of rhetorical relations, a portion of the hierarchy may be specified by a schema and the NLG system may generate the rest of the hierarchy by identifying one or more other rhetorical relations to complete the hierarchy so that the constraints associated with all the rhetorical relations in the hierarchy are satisfied.

In embodiments where generating a document plan comprises generating a rhetorical tree, the NLG system may determine a portion of the rhetorical tree using the schema and derive the rest of the rhetorical tree by searching for a set of rhetorical relations to complete the determined portion of the rhetorical tree such that at least a portion of each item of content is associated with a leaf node in the rhetorical tree and all the constraints associated with the rhetorical relations in the tree are satisfied. The generated rhetorical tree may comprise at least one node (i.e., a root node and/or at least one internal node) associated with at least one rhetorical relation specified by the schema, at least one internal node associated with at least one rhetorical relation identified by the searching, and a plurality of leaf nodes such that at least a portion of each item of content obtained at act 402 is associated with one of the plurality of leaf nodes.

The NLG system may determine a portion of the rhetorical tree using the schema in any suitable way. In some embodiments, the schema may specify a partial rhetorical tree which may be used as the portion of the rhetorical tree representing the document plan. In this way, the partial rhetorical tree in the schema will be a part of any rhetorical tree generated as part of a document plan. For example, the NLG system may generate a rhetorical tree representing a document plan for expressing the items of content shown in FIG. 6A by using the partial rhetorical tree in the schema shown in FIG. 6B as a portion of the rhetorical tree. In this way, the partial rhetorical tree shown in FIG. 6B (i.e., the tree having a root node associated with a List relation and a child node of the root node associated with the Violation relation) will be part of the rhetorical tree generated by the NLG system (see e.g., the rhetorical tree shown in FIG. 6C which comprises the partial rhetorical tree shown in FIG. 6B).

Given a portion of a rhetorical tree, determined by using the schema obtained at act 406, the NLG system may derive the rest of the rhetorical tree by identifying a set of one or more rhetorical relations to complete the determined portion of the rhetorical tree such that the rhetorical tree relates all the items of content obtained at act 402.

In some embodiments, the set of one or more rhetorical relations to complete the determined portion of the rhetorical tree may be identified by searching among rhetorical trees subject to identify a feasible rhetorical tree that comprises the determined portion and that satisfies a set of constraints. The feasible rhetorical tree may then be returned as the document plan. The set of constraints may include the strong constraints associated with the rhetorical relations in the feasible rhetorical tree. Examples of strong constraints are provided herein. The set of constraints may also include one or more of the weak constraints associated with the rhetorical relations in the feasible rhetorical tree. Examples of weak constraints are provided herein. The set of constraints may also include one or more constraints specified in the schema obtained at act 406, examples of which have been provided. The set of constraints may also include one or more global constraints that may be applied regardless of what schema is chosen. Examples of such global constraints are provided below.

Accordingly, in some embodiments, the set of one or more rhetorical relations to complete the determined portion of the rhetorical tree may be identified by searching for a rhetorical tree that satisfies a set of constraints. Identifying a solution among a finite set of potential solutions (e.g., identifying a rhetorical tree from among a set of possible rhetorical trees, which is finite since there is a finite number of items of content and a finite number of rhetorical relations to relate them) subject to a set of constraints is a type of combinatorial optimization and/or constraint satisfaction problem. Accordingly, the search may be performed by any of numerous techniques used for solving combinatorial optimization and/or constraint satisfaction problems. For example, the search may be performed by a brute force search during which solutions are iteratively examined and each solution is checked to determine whether the solution satisfies the constraints. As another example, the search may be performed using depth first search using constraint propagation (and, optionally, with intelligent backtracking). As another example, a mixed integer programming technique may be used. In some embodiments, local search algorithms such as genetic algorithms, tabu search algorithms, simulated annealing may be used.

FIG. 6C shows a non-limiting example of a document plan that may be generated by an NLG system based on the items of content and associated metadata illustrated in FIG. 6A and the schema illustrated in FIG. 6B. As may be seen, the document plan comprises a rhetorical tree that comprises the partial rhetorical tree shown in FIG. 6B and contains an Evidence constraint thereby satisfying the constraint in the schema of FIG. 6B indicating that the document plan is to comprise at least one Evidence relation. Moreover, at least a portion of each of the items of content is associated with a respective leaf node of the rhetorical tree.

It should be appreciated that process 400 is illustrative and that variations of process 400 are possible. For example, the order of acts 404 and 406 may be switched, as aspects of the technology described herein are not limited by the order in which these acts are performed. As another example, act 404 may be omitted in embodiments where any information used to determine whether particular items of content are related by one or more rhetorical relations is obtained at act 402.

Some aspects of the technology described herein may be understood further based on the disclosure and illustrative non-limiting embodiments provided below in Sections 1-3.

Initially, we note that the following first-order logic symbols are used below: ¬ (not), ∧ (and), ∨ (or), ∃ (there exists), ∀ (for all). In addition, when describing a relation, the symbols α and β are used to denote the items of content related by the relation, and the symbol γ is used to denote the nucleus of the relation, the satellite of the relation, and the virtual item representing the relation (the "head" of the relation).

The item of content denoted by the symbol α may be referred to as a "nucleus" of the relation and to the item of content denoted by the symbol β as the "satellite" of the relation. In some instances, the meaning of the information in the satellite of a relation may be incoherent on its own, but may be understood with reference to the information in the nucleus of a relation.

I. Rhetorical Relations

As discussed above, a rhetorical relation between two items of content α and β may be associated with one or more constraints that the items of content are to satisfy in order to be related by the rhetorical relation, a virtual item of content to represent the relation when that relation is a child of another relation in a hierarchy of rhetorical relations (i.e., the "head" of the rhetorical relation), and one or more predicates that may be needed to evaluate the constraints. Illustrative examples of such constraints, virtual items, and/or predicates are provided for some rhetorical relations. Although in some embodiments, the rhetorical relations described below may be associated with the constraints, virtual items of content, and/or predicates provided below, it should be appreciated that these examples are non-limiting and that in some embodiments, the rhetorical relations described below may be associated with different constraints, virtual items of content, and/or predicates.

a. Join Relation

As discussed above, the Join relation may allow for aggregation of items of content. The Join relation may not be indicative of any particular semantic relationship among the items of content aggregated by the relation. Accordingly, the Join relation may not be associated with any constraints and/or predicates.

In some embodiments, the virtual item of content associated with the Join relation may be defined according to:

$$\gamma.id=\{\alpha.id,\beta.id\}$$

$$\gamma.userNeedScore=\alpha.userNeedScore+\beta.userNeedScore$$

$$\gamma.characteristicScore=\alpha.characteristicScore+\beta.characteristicScore,$$

where α.id is an identifier of the item of content α, α.userNeedScore is the user need score associated with the item α (as discussed above, the user need score associated with an item of content may be a value, determined based at least in part on information about a person, indicative of how persuasive the information in the item of content is likely to be the person), and, α.characteristicScore is the user characteristic score associated with the item α (as discussed above, the characteristic score associated with item α may be a value, determined independently of any information about a person, indicative of how persuasive the information in the item of content is likely to be to the person). Similarly, are the identifier, user need score, and characteristic score associated with the item of content β are denoted by βid, β.userNeedScore, and β.characteristicScore, respectively. The identifier, user need score, and characteristic score associated with the virtual item of content γ are denoted by γ.id, γ.userNeedScore, and γ.characteristicScore, respectively. The identifier of a virtual item of content may be a set with the following semantic: if C(γ.id) is a constraint with a reference to the identifier of a virtual item of content γ, then the following must hold true:

$$C(\gamma.id) \Leftrightarrow [\forall x, x\in\gamma.id \Leftrightarrow C(x)]$$

b. Evidence Relation

As discussed above, two items of content may be related via the Evidence relation when the information in one item of content may be used to provide evidence (e.g., support) for the information in another item of content.

In some embodiments, the Evidence relation may be associated with two predicates: Claim(a) and Support(a,b). The predicate Claim(a) asserts that the item of content "a" comprises information (e.g., a claim, an assertion, a statement, a reason, etc.) that may not be persuasive (e.g., believable) without further supporting information. For example, if an item of content comprises the information indicating that "a car is fast," that information may not be persuasive without further supporting information (e.g., information indicating that the car accelerates from 0 to 60 in 2.9 seconds). The predicate Support(a,b) asserts that the item of content "b" comprises information bolstering the credibility of (e.g., supporting) of item of content "a."

In some embodiments, the Evidence relation may be associated with constraints, such that when two items of content α and β satisfy these constraints, the items of content may be related by the Evidence relation. The constraints may include:

1. Strong constraint on α:α must be a claim: Claim(α).
2. Strong constraint on α and β:β must be a support of α:Support(α,β).

Accordingly, in some embodiments, when an item of content α is associated with the predicate Claim(α) and the item of content β is associated with the predicate Support (α,β), the items of content may be related by the Evidence relation.

In some embodiments, the virtual item of content γ associated with the Evidence relation is the nucleus of the Evidence relation. That is, when the Evidence relation relates items of content α and β, the virtual item of content may be defined according to:

$$\gamma=\alpha.$$

c. Violation Relation

As discussed above, two items of content may be related via the "Violation" relation when dissuasive information in the first item of content may be balanced by persuasive information in the second item of content.

In some embodiments, the Violation relation may be associated with the Topic(a,s) predicate, which asserts that information in item of content a is associated with a topic name s.

In some embodiments, the Violation relation may be associated with constraints, such that when two items of content α and β satisfy these constraints, the items of content may be related by the Violation relation. The constraints may include:

1. Strong constraint on α: the user need score associated with item of content α must be negative or the user need score associated with α must be zero and the characteristic score associated with α must be negative. This constraint may be expressed as follows:

$$\alpha.userNeedScore<0 \lor (\alpha.userNeedScore=0 \land \alpha.characteristicScore<0).$$

2. Strong constraint on β: the user need score associated with item of content β must be positive or the user need score associated with β must be zero and the characteristic score associated with β must be non-negative. This constraint may be expressed as follows:

$$\beta.\text{userNeedScore}>0 \lor (\beta.\text{userNeedScore}=0 \land \alpha.\text{characteristicScore}\geq 0).$$

3. Weak constraint on α and β: the sum of the user need scores (associated with α and β) is positive or the sum of the user need scores is zero and the sum of the user characteristic scores (associated with α and β) is non-negative. This constraint may be expressed as follows (in terms of the virtual item of content γ for the Violation relation, described below):

$$\gamma.\text{userNeedScore}>0 \lor (\gamma.\text{userNeedScore}=0 \land \gamma.\text{characteristicScore}\geq 0).$$

4. Weak constraint on α and β: both items of content must be associated with a same topic. This constraint may be expressed as follows:

$$\exists x, \text{Topic}(\alpha,x) \land \text{Topic}(\beta,x).$$

In some embodiments, the virtual item of content associated with the Violation relation may be defined according to:

γ.name=α.name

γ.userNeedScore=α.userNeedScore+β.userNeedScore

γ.characteristicScore=α.characteristicScore+β.characteristicScore d. Concession Relation As discussed above, two items of content may be related via the Concession relation when persuasive information in the first item of content balances dissuasive information in the second item of content.

In some embodiments, like the Violation relation, the Concession relation may be associated with the Topic(a,s) predicate, which asserts that information in item of content a is associated with a topic name s.

In some embodiments, the Concession relation may be associated with constraints, such that when two items of content α and β satisfy these constraints, the items of content may be related by the Concession relation. The constraints may be analogous to the constraints of the Violation relation with the nucleus and the satellite inverted, and may include:

1. Strong constraint on α: the user need score associated with item of content α must be positive or the user need score associated with α must be zero and the characteristic score associated with α must non-negative. This constraint may be expressed as follows:

$$\alpha.\text{userNeedScore}>0 \lor (\alpha.\text{userNeedScore}=0 \land \alpha.\text{characteristicScore}\geq 0).$$

2. Strong constraint on β: the user need score associated with item of content β must be negative or the user need score associated with β must be zero and the characteristic score associated with β must be negative. This constraint may be expressed as follows:

$$\beta.\text{userNeedScore}<0 \lor (\beta.\text{userNeedScore}=0 \land \alpha.\text{characteristicScore}<0).$$

3. Weak constraint on α and β: the sum of the user need scores (associated with α and β) is positive or the sum of the user need scores is zero and the sum of the user characteristic scores (associated with α and β) is non-negative. This constraint may be expressed as follows (in terms of the virtual item of content γ for the Violation relation, described below):

$$\gamma.\text{userNeedScore}>0 \lor (\gamma.\text{userNeedScore}=0 \land \gamma.\text{characteristicScore}\geq 0).$$

4. Weak constraint on α and β: both items of content must be associated with a same topic. This constraint may be expressed as follows:

$$\forall x, \text{Topic}(\alpha,x) \land \text{Topic}(\beta,x).$$

In some embodiments, the virtual item of content associated with the Concession relation may be defined according to:

γ.name=α.name

γ.userNeedScore=α.userNeedScore+β.userNeedScore

γ.characteristicScore=α.characteristicScore+β.characteristicScore e. Comment Relation As discussed above, the Comment relation allows for the combination of multiple items of content into a single item of content. In some embodiments, two items of content may be related by the Comment relation, when the items of content were previously a portion of the same more complex item of content, which complex item of content may have been decomposed during pre-processing into constituent items of content. For example, an item of content "Car is black which is your favorite color" may have been decomposed, during pre-processing, into two constituent items of content "Car is black" and "Favorite Color." These constituent items of content may be related via the comment relation.

In some embodiments, the Comment relation may be associated with the Decomposition(a, b, c) predicate, which asserts that the argument "a" (e.g., "Car is black which is your favorite color") can be decomposed into the arguments "b" (e.g., "Car is Black") and "c" (e.g., "Favorite Color"). Two arguments b and c being the decomposition of a means that once they are linked by a Comment relation, these two arguments have the same meaning than a alone.

In some embodiments, the Comment relation may be associated with one or more constraints such that when two items of content α and β satisfy these constraint(s), the items of content may be related by the Comment relation. The constraint(s) and may include:

1. Strong constraint on α and β: Items of content α and β must be the decomposition of a complex argument. This constraint may be expressed as follows:

$$\forall X, \text{Decomposition}(x,\alpha,\beta)$$

In some embodiments, the virtual item of content γ associated with the Comment relation may be defined as the unique virtual item of content whose decomposition is α and β. This may be expressed as follows:

γ=x where x is the only argument s.t. Decomposition (x,α,β) is true.

II. Pre-Processing Rules

As discussed above, in some embodiments, an NLG system may perform processing on the items of content to obtain information subsequently used to determine whether particular items of content are related by one or more rhetorical relationships. In some embodiments, such processing may comprise deriving particular pieces of information for each of one or more rhetorical relations. Such processing may be performed using rules including the illustrative rules described below.

a. Rules Related to Violation and Concession Relations

As may be appreciated from the above, the Violation and Concession relations may be associated with a Topic(a,s) predicate. This predicate may be derived in accordance with one or more rules following the pattern:

$$\forall x, x=a \Rightarrow \text{Topic}(x, \text{topicname}),$$

where "a" is an item of content and topicname is a topic (e.g., "Price," "Options," etc.). As a specific non-limiting example, when an item of content "argumentOnPrice" indicating that the a price of a car is lower than that offered by other dealers, the following rule may be applied to generate a Topic predicate associated with the rule:

$$\forall x, x=\text{arguemntOnPrice} \Rightarrow \text{Topic}(x, \text{"Price"}).$$

b. Rules Related to the Evidence Relation

In some embodiments, received items of content may be processed to create new items of content comprising statements (e.g., claims, assertions, etc.) that may be supported by one or more of the received items of content. For example, when a first item of content comprises information indicating that a car accelerates from 0 to 60 in 2.9 seconds, a second item of content indicating that the "car is fast" (which is an example of an assertion) may be generated based, at least in part, on processing the first item of content because the first item of content may provide support for the claim in the second item of content. Such processing may be performed in any suitable way and, for example, may be performed using one or more rules following the following pattern:

$$\forall x, x=a \Rightarrow \exists y, y=\text{Argument}(id, score1, score2) \wedge \text{Claim}(y) \wedge \text{Support}(y,x).$$

As a specific non-limiting example, the item of content "Car price is lower than that of other dealers" associated with a user need value of 0.2 and a characteristic score of 0.0 may be processed to generate a new item of content (e.g., "We have the best price") that is supported by the first item by application of the following rule:

$$\forall x, x=\text{myargument} \Rightarrow \exists y, y=\text{Argurment}(\text{"We have the best price"}, 0.8, 0.9) \wedge \text{Claim}(y) \wedge \text{Support}(y,x).$$

c. Rules Related to the Comment Relation

As may be appreciated from the above, the Comment relation may be associated with a Decomposition(a,b,c) predicate. This predicate may be derived in accordance with one or more rules following the patterns:

$$\forall x, x=a \Rightarrow \exists y, \exists z, y=\text{Argument}(id1, score1, score2) \wedge z=\text{Argument}(id2, score3, score4) \wedge \text{Decomposition}(x,y,z)$$

and $$\forall x, \forall y, x=a \wedge y=b \Rightarrow \exists z, z=\text{Argument}(id, score1, score2) \wedge \text{Decomposition}(z,y,x),$$

where the function "Argument(x,y,z)" generates an item of content (e.g., it is a constructor) having x as an identifier, y as a user need score, and z as a characteristic score.

Amu specific non-limiting example, an item of content "Car is black which is your favorite color" associated with a user need value of 0.2 and a characteristic score of 0.0 may be decomposed into constituent items of content by applying the following rule:

$$\forall x, x=\text{carBlackWhichsFavoriteColor} \Rightarrow \exists y, \exists z, y=\text{Argument}(\text{"Car is black"}, 0, 0) \wedge z=\text{Argument}(\text{"Favorite color"}, 0.2, 0) \wedge \text{Decomposition}(x,y,z)$$

III. Global Constraints

As discussed above, in some embodiments generating a document plan may comprise identifying a rhetorical tree that satisfies a set of constraints. In some embodiments, the set of constraints may include one or more strong and/or weak constraints associated with the rhetorical relations in the rhetorical tree, one or more constraints specified in a schema, and/or one or more of the global constraints described below.

1. A strong global constraint requiring that the Join relation cannot be the root of any sub-tree. That is, a node in the rhetorical tree that is associated with a Join relation may not have a child node also associated with a Join relation. This constraint may be expressed according to:

$$\forall z, \forall y, \text{Join}(x,y) \Rightarrow \text{Evidence}(x,y) \wedge \text{Violation}(x,y) \wedge \text{Concession}(x,y) \wedge \text{Comment}(x,y)$$

Thus, if two items of content x and y are related via the Join relation, the above constraint implies that x and y are also related via one or more of the evidence relation, the violation relation, the concession relation, and the comment relation.

2. A weak global constraint requiring that the rhetorical tree include an Evidence relation relating a first item of content to a second item of content when it is known that the second item of content supports the first item of content. This constraint may be used to promote solutions, where claims are not made without being further supported. This constraint may be expressed according to:

$$\forall x, \forall y, \text{Support}(x,y) \Rightarrow \text{Evidence}(x,y).$$

3. A strong global constraint requiring that the items of content obtained by decomposing another item of content be recomposed using the Comment relation. This may be done to force the re-composition of items of content, which on their own may be incoherent. This constraint may be expressed according to:

$$\forall x, \forall y, \forall z, \text{Decomposition}(x,y,z) \Rightarrow \text{Comment}(y,z).$$

Additional Implementation Detail

Figure 7:
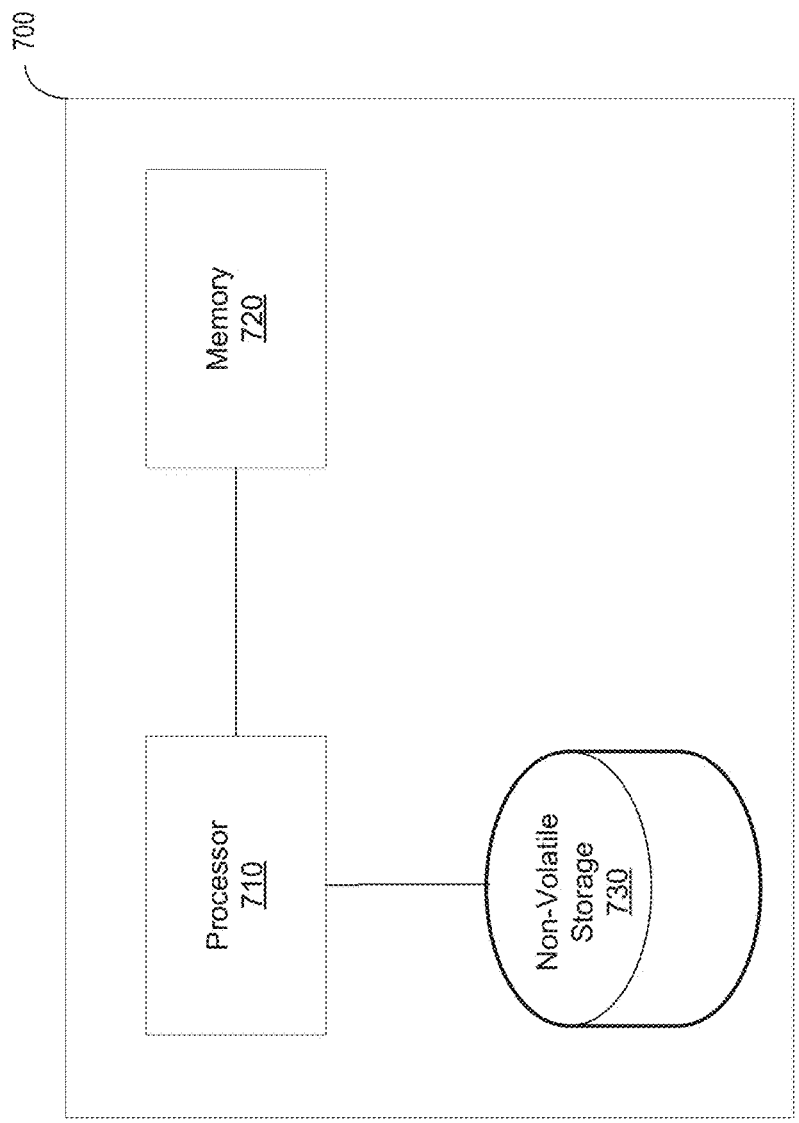
FIG. 7 is a block diagram of an illustrative computer system that may be used in implementing some embodiments.

An illustrative implementation of a computer system 700 that may be used in connection with any of the embodiments of the disclosure provided herein is shown in FIG. 7. The computer system 700 may include one or more processors 710 and one or more articles of manufacture that comprise non-transitory computer-readable storage media (e.g., memory 720, one or more non-volatile storage media 730, etc.). The processor 710 may control writing data to and reading data from the memory 720 and the non-volatile storage device 730 in any suitable manner, as the aspects of the disclosure provided herein are not limited in this respect. To perform any of the functionality described herein, the processor 710 may execute one or more processor-executable instructions stored in one or more non-transitory computer-readable storage media (e.g., the memory 720), which may serve as non-transitory computer-readable storage media storing processor-executable instructions for execution by the processor 710.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., FIG. 4) has been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for use in connection with generating text, the method comprising:
   using at least one computer hardware processor to perform:
      obtaining a plurality of items of content and associated metadata, the associated metadata comprising information indicative of how persuasive at least one of the plurality of items of content is likely to be to a person;
      obtaining a schema specifying a first set of one or more rhetorical relations;
      identifying a second set of one or more rhetorical relations among items of content in the plurality of items of content based, at least in part, on the associated metadata, wherein the second set of rhetorical relations is not in the schema;
      generating a document plan comprising a plurality of rhetorical relations among the items of content in the plurality of items of content, the plurality of rhetorical relations including the first set of rhetorical relations and the second set of rhetorical relations;
      generating an electronic document comprising natural language text based, at least in part, on the document plan; and
      providing the electronic document to the person.

2. The method of claim 1, wherein the plurality of items of content comprises a first item of content associated with first metadata in the associated metadata;
   wherein the first item of content indicates a first reason for the person to perform an action, the reason comprising information about a subject of the action; and
   wherein the first metadata comprises:
      a first value, determined based at least in part on information about the person, indicative of how persuasive the first reason is likely to be to the person; and
      a second value, independent of any information about the person, indicative of how persuasive the first reason is likely to be to any person.

3. The method of claim 2, wherein the reason for the person to perform an action comprises a reason for the person to purchase a product.

4. The method of claim 3, wherein the information about the subject of the action comprises information about a characteristic of the product, and wherein the first value is determined based on whether the information about the person indicates that the person has a preference for a product having the first characteristic.

5. The method of claim 1, wherein generating the document plan comprises generating a hierarchy of rhetorical relations comprising the plurality of rhetorical relations.

6. The method of claim 5, wherein generating the hierarchy of rhetorical relations comprises generating a tree comprising:
   a root node associated with a rhetorical relation in the first set of rhetorical relations; and
   a plurality of leaf nodes associated with at least one item of content in the plurality of items of content.

7. The method of claim 6, wherein the tree further comprises:
   at least one internal node associated with at least one rhetorical relation in the second set of rhetorical relations.

8. The method of claim 1, wherein identifying the second set of rhetorical relations comprises solving a constraint satisfaction problem.

9. The method of claim 1, wherein the plurality of items of content comprises a first item of content and a second item of content, and wherein identifying the second set of rhetorical relations comprises determining whether the first item of content and the second item of content satisfy at least one rhetorical relation based, at least in part, on metadata associated with the first item of content and metadata associated with the second item of content.

10. The method of claim 9, wherein when it is determined that the first item of content and the second item of content satisfy the at least one rhetorical relation, the method further comprises generating, based at least in part on metadata associated with the first item of content and metadata associated with the second item of content, a virtual item of content associated with the at least one rhetorical relation.

11. The method of claim 10, wherein the plurality of items of content comprises a third item of content, and wherein identifying the second set of rhetorical relations further comprises determining whether the virtual item of content and the third item of content satisfy at least one rhetorical relation.

12. The method of claim 1, wherein each of the rhetorical relations in the second set of rhetorical relations is selected from the group consisting of: the join relation, the violation relation, the concession relation, the evidence relation, and the comment relation.

13. At least one non-transitory computer-readable storage medium storing processor executable instructions that, when executed by at least one computer hardware processor, cause the at least one computer hardware processor to perform a method for use in connection with generating text, the method comprising:
  obtaining a plurality of items of content and associated metadata, the associated metadata comprising information indicative of how persuasive at least one of the plurality of items of content is likely to be to a person;
  obtaining a schema specifying a first set of one or more rhetorical relations;
  identifying a second set of one or more rhetorical relations among items of content in the plurality of items of content based, at least in part, on the associated metadata, wherein the second set of rhetorical relations is not in the schema;
  generating a document plan comprising a plurality of rhetorical relations among the items of content in the plurality of items of content, the plurality of rhetorical relations including the first set of rhetorical relations and the second set of rhetorical relations;
  generating an electronic document comprising natural language text based, at least in part, on the document plan; and
  providing the electronic document to the person.

14. The at least one non-transitory computer-readable storage medium of claim 13, wherein the plurality of items of content comprises a first item of content associated with first metadata in the associated metadata;
  wherein the first item of content indicates a first reason for the person to perform an action, the reason comprising information about a subject of the action; and
  wherein the first metadata comprises:
    a first value, determined based at least in part on information about the person, indicative of how persuasive the first reason is likely to be to the person; and
    a second value, independent of any information about the person, indicative of how persuasive the first reason is likely to be to any person.

15. The at least one non-transitory computer-readable storage medium of claim 14, wherein the reason for the person to perform an action comprises a reason for the person to purchase a product, and wherein the information about the subject of the action comprises information about a characteristic of the product, and wherein the first value is determined based on whether information about the person indicates that the person has a preference for a product having the first characteristic.

16. The at least one non-transitory computer-readable storage medium of claim 13, wherein generating the document plan comprises generating a hierarchy of rhetorical relations comprising the plurality of rhetorical relations.

17. The at least one non-transitory computer-readable storage medium of claim 13, wherein the plurality of items of content comprises a first item of content and a second item of content, and wherein identifying the second set of rhetorical relations comprises determining whether the first item of content and the second item of content satisfy at least one rhetorical relation based, at least in part, on metadata associated with the first item of content and metadata associated with the second item of content.

18. The at least one non-transitory computer-readable storage medium of claim 17, wherein when it is determined that the first item of content and the second item of content satisfy the at least one rhetorical relation, the method further comprises generating, based at least in part on metadata associated with the first item of content and metadata associated with the second item of content, a virtual item of content associated with the at least one rhetorical relation.

19. A system, comprising:
  at least one computer hardware processor; and
  at least one non-transitory computer-readable storage medium storing processor executable instructions that, when executed by the at least one computer hardware processor, cause the at least one computer hardware processor to perform a method for use in connection with generating text, the method comprising:
    obtaining a plurality of items of content and associated metadata, the associated metadata comprising information indicative of how persuasive at least one of the plurality of items of content is likely to be to a person;
    obtaining a schema specifying a first set of one or more rhetorical relations;
    identifying a second set of one or more rhetorical relations among items of content in the plurality of items of content based, at least in part, on the associated metadata, wherein the second set of rhetorical relations is not in the schema;
    generating a document plan comprising a plurality of rhetorical relations among the items of content in the plurality of items of content, the plurality of rhetorical relations including the first set of rhetorical relations and the second set of rhetorical relations;
    generating an electronic document comprising natural language text based, at least in part, on the document plan; and
    providing the electronic document to the person.

20. The system of claim 19, wherein the plurality of items of content comprises a first item of content associated with first metadata in the associated metadata;
  wherein the first item of content indicates a first reason for the person to perform an action, the reason comprising information about a subject of the action; and
  wherein the first metadata comprises:
    a first value, determined based at least in part on information about the person, indicative of how persuasive the first reason is likely to be to the person; and
    a second value, independent of any information about the person, indicative of how persuasive the first reason is likely to be to any person.

21. The system of claim 20, wherein the reason for the person to perform an action comprises a reason for the person to purchase a product, and wherein the information about the subject of the action comprises information about a characteristic of the product, and wherein the first value is determined based on whether information about the person indicates that the person has a preference for a product having the first characteristic.

22. The system of claim 19, wherein generating the document plan comprises generating a hierarchy of rhetorical relations comprising the plurality of rhetorical relations.

23. The system of claim 19, wherein the plurality of items of content comprises a first item of content and a second item of content, and wherein identifying the second set of rhetorical relations comprises determining whether the first item of content and the second item of content satisfy at least one rhetorical relation based, at least in part, on metadata associated with the first item of content and metadata associated with the second item of content.

24. The system of claim 23, wherein when it is determined that the first item of content and the second item of content satisfy the at least one rhetorical relation, the method further comprises generating, based at least in part on metadata associated with the first item of content and metadata associated with the second item of content, a virtual item of content associated with the at least one rhetorical relation.

* * * * *

UNITED STATES PATENT AND TRADEMARK OFFICE
CERTIFICATE OF CORRECTION

PATENT NO. : 9,582,501 B1
APPLICATION NO. : 14/305183
DATED : February 28, 2017
INVENTOR(S) : Raphaël François André Salmon et al.

It is certified that error appears in the above-identified patent and that said Letters Patent is hereby corrected as shown below:

On the Title Page

In item (71) Applicant:
Please replace "Lyons" with --Lyon--.

In item (72) Inventors:
Please replace "Lyons" with --Lyon--.

Signed and Sealed this
Twenty-fifth Day of April, 2017

Michelle K. Lee
*Director of the United States Patent and Trademark Office*